(12) United States Patent
Bae et al.

(10) Patent No.: US 10,977,857 B2
(45) Date of Patent: Apr. 13, 2021

(54) APPARATUS AND METHOD OF THREE-DIMENSIONAL REVERSE MODELING OF BUILDING STRUCTURE BY USING PHOTOGRAPHIC IMAGES

(71) Applicant: CUPIX, INC., Seongnam-si (KR)

(72) Inventors: SeockHoon Bae, Seoul (KR); ChangYoon Yang, Seoul (KR)

(73) Assignee: CUPIX, INC., Seongnam-si (KR)

( * ) Notice: Subject to any disclaimer, the term of this patent is extended or adjusted under 35 U.S.C. 154(b) by 0 days.

(21) Appl. No.: 16/700,852

(22) Filed: Dec. 2, 2019

(65) Prior Publication Data
US 2020/0175753 A1    Jun. 4, 2020

(30) Foreign Application Priority Data

Nov. 30, 2018 (KR) .......................... 10-2018-0151675

(51) Int. Cl.
*G06T 17/00* (2006.01)
*G06T 7/70* (2017.01)
*G06T 11/20* (2006.01)

(52) U.S. Cl.
CPC .............. *G06T 17/00* (2013.01); *G06T 7/70* (2017.01); *G06T 11/203* (2013.01); *G06T 2207/20221* (2013.01); *G06T 2210/56* (2013.01)

(58) Field of Classification Search
CPC ......... G06T 7/70; G06T 11/203; G06T 17/00; G06T 2207/20221; G06T 2210/56
See application file for complete search history.

(56) References Cited

U.S. PATENT DOCUMENTS

| 8,825,452 B2 | 9/2014 | Shono et al. |
| 8,947,423 B2 * | 2/2015 | Ocali .................. G06T 1/00 345/419 |
| 10,706,321 B1 * | 7/2020 | Chen .................. G06T 7/001 |

(Continued)

FOREIGN PATENT DOCUMENTS

| JP | 2017-191022 A | 10/2017 |
| KR | 10-2016-0070012 A | 6/2016 |

(Continued)

*Primary Examiner* — Ke Xiao
*Assistant Examiner* — Jed-Justin Imperial
(74) *Attorney, Agent, or Firm* — Knobbe Martens Olson & Bear LLP

(57) ABSTRACT

Provided are an apparatus and method of three-dimensional reverse modeling of a building structure by using photographic images, and more particularly, to an apparatus and method of three-dimensional reverse modeling of a building structure by using photographic images, in which three-dimensional modeling data of a building structure may be quickly and conveniently reversely modeled by using a plurality of photographic images. According to the apparatus and method of three-dimensional reverse modeling of a building structure by using photographic images, three-dimensional modeling data of a building structure may be reversely modeled by using photographic images of the building structure captured using a camera, at low costs and quickly and easily, thereby remarkably increasing the productivity of the manufacture of a building information model (BIM).

27 Claims, 14 Drawing Sheets

(56) References Cited

U.S. PATENT DOCUMENTS

| | | | | |
|---|---|---|---|---|
| 2010/0092072 A1* | 4/2010 | Guntur | ............... | G06F 30/00 |
| | | | | 382/154 |
| 2015/0097829 A1* | 4/2015 | Algreatly | ............ | G06T 13/20 |
| | | | | 345/420 |
| 2015/0237325 A1* | 8/2015 | Angot | ............. | H04N 13/271 |
| | | | | 348/47 |
| 2018/0247430 A1* | 8/2018 | Koga | ............... | G06T 19/006 |
| 2019/0026917 A1* | 1/2019 | Liao | ................ | G06K 9/4628 |

FOREIGN PATENT DOCUMENTS

| | | |
|---|---|---|
| KR | 10-1688746 B1 | 12/2016 |
| KR | 10-2017-0142265 A | 12/2017 |

* cited by examiner

APPARATUS AND METHOD OF THREE-DIMENSIONAL REVERSE MODELING OF BUILDING STRUCTURE BY USING PHOTOGRAPHIC IMAGES

CROSS-REFERENCE TO RELATED APPLICATION

This application claims the benefit of Korean Patent Application No. 10-2018-0151675, filed on Nov. 30, 2018, in the Korean Intellectual Property Office, the disclosure of which is incorporated herein in its entirety by reference.

BACKGROUND

1. Field

The present disclosure relates to an apparatus and method of three-dimensional reverse modeling of a building structure by using photographic images, and more particularly, to an apparatus and method of three-dimensional reverse modeling of a building structure by using photographic images, in which three-dimensional modeling data of a building structure may be quickly and conveniently reversely modeled by using a plurality of photographic images.

2. Description of the Related Art

Recently, the design, construction, and management of buildings have been conducted increasingly based on three-dimensional Building Information Model (BIM). By using three-dimensional BIM, the efficiency of the design, construction, and management of buildings has remarkably increased, and so has productivity. Thus, the percentage of the introduction of three-dimensional BIM even from the design stage of new buildings is on the rise.

Also, in the design and development of city management systems based on a digital model of the entire city such as smart cities and the analysis of the efficiency thereof, BIM is used as a basic database of representations of building structures.

However, for existing building structures without BIM data, their BIM has to be generated by using a building reverse modeling technique.

To reversely model a three-dimensional model of a building structure, according to the related art, a building structure is three-dimensionally scanned by using a three-dimensional scanner or a method of acquiring high-density point cloud data from multiple photographic images by using a computer vision technique is used.

Use of a three-dimensional scanner involves multiple constraints in terms of the size, location, and shape, and it takes long time and high costs to use as well.

The disclosure of this section is to provide background information relating to the invention. Applicant does not admit that any information contained in this section constitutes prior art

SUMMARY

One aspect of the invention provides a method of producing a 3D computer model of a room based on photographs, the method that may comprise:
providing, to a computerized system, a plurality of sets of data associated with a first room, comprising a first set of data and a second set of data;
wherein the first set of data comprises 1) a first photographic image (e.g., (c) in FIGS. 3-6) of the first room taken by a first camera inside the first room or first data representing the first photographic image, 2) a three-dimensional (3D) location of a first optical center (e.g. 900 in FIGS. 3-6) of the first camera at the time the first photographic image was taken, and 3) a direction of a first optical axis of the first camera at the time the first photographic image was taken;
wherein the second set of data comprises 1) a second photographic image (e.g., (b) in FIG. 5) of the first room taken by a second camera inside the first room or second data representing the second photographic image, 2) a 3D location of a second optical center (e.g., 900 in FIG. 5) of the second camera at the time the second photographic image was taken, and 3) a direction of a second optical axis of the second camera at the time the second photographic image was taken, wherein the second camera is the first camera or another camera;
providing, to the computerized system, a 3D location of at least one feature of the first room;
generating, using the computerized system, a two-dimensional (2D) drawing (e.g., (a) in FIGS. 3-6) of the first room using the 3D location of the at least one feature of the first room;
generating, using the computerized system, a 3D computer model of the first room using the 2D drawing;
configuring, using the computerized system, a first view of the 3D computer model as if the first view is taken, in a 3D computer modeled space of the first room according to the 3D computer model, from the first optical center in the direction of the first optical axis as the first photographic image was taken by the first camera so that the first view and the first photographic image comprise common features;
wherein at least one of the common features of the first view and the first photographic image is not exactly in the same size even if the first view is configured as if it was taken as the first photographic image was taken by the first camera;
wherein the common features of the first view and the first photographic image comprise a first surface of the first room and a first surface edge (e.g., 912 in FIGS. 4 and 5) defined by the first surface and another surface of the first room, wherein the first surface is selected from the group consisting of a wall (e.g., 922 in FIG. 5), a floor and a ceiling of the first room, wherein the other surface is a discrete surface that the first surface neighbors without an intervening surface therebetween;
overlaying, using the computerized system, the first view and the first photographic image on at least one display screen associated with the computerized system such that the first surface of the first view and the first surface of the first photographic image overlap with each other while the first surface edge (e.g., 9121 in FIG. 4) of the first view is off from the first surface edge (e.g., 912 in FIG. 4) of the first photographic image with a first gap (e.g., 9123 in FIG. 4) therebetween;
while the first view and the first photographic image overlay on the at least one display screen, providing, to the computerized system, a user input to displace the first view relative to the first photographic image in a first direction to make the first gap zero or smaller than prior to displacing the first view (e.g., no gap between 912 and 9121 in FIG. 5);

wherein displacing the first view relative to the first photographic image in the first direction causes updating the 3D computer model of the first room such that 3D locations defining the first surface edge change in the 3D computer model in accordance with a vector representing the displacement of the first view relative to the first photographic image, configuring, using the computerized system, a second view of the 3D computer model as if the second view is taken, in a 3D computer modeled space of the first room according to the 3D computer model, from the second optical center in the direction of the second optical axis as the second photographic image was taken by the second camera so that the second view and the second photographic image comprise common features;

wherein at least one of the common features of the second view and the second photographic image is not exactly in the same size even if the second view is configured as if it was taken as the second photographic image was taken by the second camera;

wherein the common features of the second view and the second photographic image comprise a second surface of the first room and a second surface edge defined by the second surface and another surface of the first room, wherein the second surface is selected from the group consisting of a wall (e.g., 924 or 926 in FIG. 4), a floor and a ceiling of the first room, wherein the other surface is a discrete surface that the second surface neighbors without an intervening surface therebetween;

overlaying, using the computerized system, the second view and the second photographic image on at least one display screen associated with the computerized system such that the second surface of the second view and the second surface of the second photographic image overlap with each other while the second surface edge of the second view is off from the second surface edge of the second photographic image with a second gap therebetween;

while the second view and the second photographic image overlay on the at least one display screen, providing, to the computerized system, a user input to displace the second view relative to the second photographic image in a second direction to make the second gap zero or smaller than prior to displacing the second view;

wherein displacing the second view relative to the second photographic image in the second direction causes updating the 3D computer model of the first room such that 3D locations defining the second surface edge change in the 3D computer model in accordance with a vector representing the displacement of the second view relative to the second photographic image, wherein the 3D location defines a location relative to a reference point in a 3D space.

In the foregoing method, the first surface edge may be one of:

a first wall-floor edge defined between the first surface being a wall of the first room and a floor of the first room that the wall abuts, a first wall-ceiling edge defined between the first surface being a wall of the first room and a ceiling of the first room that the first surface abuts, a first wall-wall edge defined between the first surface being a wall of the first room and another wall of the first room that the wall abuts, a first floor-wall edge defined between the first surface being a floor of the first room and a wall of the first room that the floor abuts, and a first ceiling-wall edge defined between the first surface being a ceiling of the first room and a wall of the first room that the ceiling abuts.

In the foregoing method, the first surface edge is and hereinafter referred to as a first wall-floor edge defined between the first surface being a wall of the first room and a floor of the first room that the wall abuts, wherein the first gap is hereinafter referred to a first wall-floor edge gap, wherein the common features further comprises a first wall-ceiling edge defined by the wall and a ceiling of the first room that the wall abuts, wherein, when overlaying the first view and first photographic image, the first wall-floor edge of the first view may be off from the first wall-floor edge of the first photographic image with the first wall-floor edge gap therebetween and the first wall-ceiling edge of the first view is off from the first wall-ceiling edge of the first photographic image with a first wall-ceiling edge gap therebetween wherein the method further comprises:
while the first view and the first photographic image overlay on the at least one display screen, providing, to the computerized system, a user input to further displace the first view relative to the first photographic image in a direction other than the first direction to make the first wall-ceiling edge gap zero or smaller than prior to displacing the first view;

wherein further displacing the first view relative to the first photographic image in the direction other than the first direction causes further updating the 3D computer model of the first room such that 3D locations defining the first wall-ceiling edge change in the 3D computer model in accordance with a vector representing the further displacement of the first view relative to the first photographic image.

In the foregoing method, the first surface edge is and hereinafter referred to as a first wall-wall edge defined between the first surface being a wall of the first room and another wall of the first room that the first surface abuts, wherein the first gap is hereinafter referred to a first wall-wall edge gap, wherein the common features further comprises a first wall-ceiling edge defined by the wall and a ceiling of the first room that the wall abuts, wherein, when overlaying the first view and first photographic image, the first wall-wall edge of the first view may be off from the first wall-wall edge of the first photographic image with the first wall-wall edge gap therebetween and the first wall-ceiling edge of the first view is off from the first wall-ceiling edge of the first photographic image with a first wall-ceiling edge gap therebetween wherein the method further comprises:
while the first view and the first photographic image overlay on the at least one display screen, providing, to the computerized system, a user input to further displace the first view relative to the first photographic image in a direction other than the first direction to make the first wall-ceiling edge gap zero or smaller than prior to displacing the first view;

wherein further displacing the first view relative to the first photographic image in the direction other than the first direction causes further updating the 3D computer model of the first room such that 3D locations defining the first wall-ceiling edge change in the 3D computer model in accordance with a vector representing the further displacement of the first view relative to the first photographic image.

In the foregoing method, the first surface edge is and hereinafter referred to as a first wall-ceiling edge defined between the first surface being a wall of the first room and a ceiling of the first room that the wall abuts, wherein the first gap is hereinafter referred to a first wall-ceiling edge gap, wherein the common features further comprises a first wall-floor edge defined by the wall and a floor of the first room that the wall abuts, wherein, when overlaying the first view and first photographic image, the first wall-ceiling edge of the first view is off from the first wall-ceiling edge of the first photographic image with the first wall-ceiling edge gap therebetween and the first wall-floor edge of the first view is off from the first wall-floor edge of the first photographic image with a first wall-floor edge gap therebetween wherein the method further comprises:
while the first view and the first photographic image overlay on the at least one display screen, providing, to the computerized system, a user input to further displace the first view relative to the first photographic image in a direction other than the first direction to make the first wall-floor edge gap zero or smaller than prior to displacing the first view;

wherein further displacing the first view relative to the first photographic image in the direction other than the first direction causes further updating the 3D computer model of the first room such that 3D locations defining the first wall-floor edge change in the 3D computer model in accordance with a vector representing the further displacement of the first view relative to the first photographic image.

Still in the foregoing method, the 2D drawing may comprise a 2D plan view drawing of the first room.

Generating the 2D drawing of the first room may comprise:
displaying, on a plan view configuration, the 3D location of the first optical center of the first camera and the 3D location of the second optical center of the second camera;
displaying the 3D location of the at least one feature of the first room on the plan view configuration;
generating, on the plan view configuration, at least one line representing at least one wall of the first room using the 3D location of the at least one feature of the first room.

Yet in the foregoing method, the at least one feature of the first room may comprise one of a plurality of corners of a first wall, wherein the vector representing the displacement of the first view comprises a size of the displacement and the first direction of the displacement. The at least one feature of the first room may comprise a plurality of features of the first room, which comprises one of a plurality of corners of the first surface and one of a plurality of corners of the second surface. Generating the at least one line representing at least one wall may comprise connecting with a line between the one of a plurality of corners of the first surface and the one of a plurality of corners of the second surface. The 3D location of the at least one feature of the first room may also be used in generating the 3D computer model of the first room.

Still in the foregoing method, wherein, when the 3D locations defining the first surface edge change in the 3D computer model, 3D locations defining another edge of the first surface also change in the 3D computer model.

Further in the foregoing method, the plurality of sets of data may further comprise a third set of data, which comprises: 1) a third photographic image of a first room taken by a third camera inside the first room or third data representing the third photographic image, 2) a three-dimensional (3D) location of a third optical center of the third camera at the time the third photographic image was taken, and 3) a direction of a third optical axis of the third camera at the time the third photographic image was taken, wherein the third camera is the first camera, the second camera or another camera, wherein providing 3D locations of a plurality of features of the first room comprises determining, by the computerized system, a 3D location of a first feature that appears on both the first photographic image and the third photographic image.

In the foregoing method, determining the 3D location of the first feature may comprise:
providing, to the computerized system, a 2D size of a first projection surface, on which an optical image is projected inside the first camera for capturing the optical image, or information leading to the 2D size of the first projection surface of the first camera;
providing, to the computerized system, a 2D size of a third projection surface, on which an optical image is projected inside the third camera for capturing the optical image, or information leading to the 2D size of the third projection surface of the third camera;
providing, to the computerized system, a first distance between the first optical center and the first projection surface along the first optical axis or information leading to the first distance of the first camera;
providing, to the computerized system, a third distance between the third optical center and the third projection surface along the third optical axis or information leading to the third distance of the third camera;
receiving a first selection of a first point representing the first feature of the first room on the first photographic image displayed on at least one display screen of the computerized system;
receiving a second selection of a second point representing the first feature of the first room on the third photographic image displayed on the at least one display screen of the computerized system; and
causing at least one processor of the computerized system to execute computer software stored in at least one memory of the computerized system to perform the following:
processing the first photographic image, the 2D size of the first projection surface, the direction of the first optical axis, and the first distance to compute a 3D location of a first projection point at which the first feature of the first room would have been projected on the first projection surface, or on an imaginary plane parallel to the first projection surface, at the time the first photographic image was taken by the first camera,
processing the third photographic image, the 2D size of the third projection surface, the direction of the third optical axis, and the third distance to compute a 3D location of a third projection point at which the first feature of the first room would have been projected on the third projection surface, or an imaginary plane parallel to the third projection surface, at the time the third photographic image was taken by the third camera, and processing the 3D location of the first projection point, the 3D location of the first optical center, the 3D location of the third projection point, and the 3D location of the third optical center to compute a 3D location of the first feature of the first room as a first imaginary straight line passing the 3D location of the first projection point and the 3D location of the first optical center would also pass or pass by the first feature of the first room and further a second imaginary straight line passing the 3D location of the third projection point and the 3D location of the third optical center would also pass or pass by the first feature of the first room such that the first imaginary straight line and the second imaginary straight line cross or are close to each other at or near the first feature.

In the foregoing method, the first photographic image and the third photographic image may be two-dimensional images of the first room and taken from different locations of the first room such that some features of the first room are depicted in both of the first photographic image and the third photographic image.

In the foregoing method, processing to compute the 3D location of the first projection point on the first projection surface may comprise:
processing the first photographic image to determine a 2D size of the first photographic image;
processing the first photographic image to determine a 2D location of the first point on the first photographic image;
subsequently, processing the 2D size of the first projection surface, the 2D size of the first photographic image, and the 2D location of the first point on the first photographic image to determine a 2D location of the first projection point on the first projection surface that corresponds to the first point on the first photographic image; and
subsequently, processing the direction of the first optical axis, the 3D location of the first optical center, the first distance, and the 2D location of the first projection point on the first projection surface to determine the 3D location of the first projection point at which the first feature would have been projected on the first projection surface at the time the first photographic image was taken,
wherein the 2D location defines a location relative to a reference point in a 2D plane.

In the foregoing method, in determining the 2D location of the first projection point on the first projection surface, the 2D size of the first projection surface and the 2D size of the first photographic image may be used to provide a ratio therebetween. Determining the 2D location of the first projection point on the first projection surface may further comprise mapping the first point on the first photographic image on the first projection surface in view of the ratio between the 2D size of the first projection surface and the 2D size of the first photographic image. The first point on the first photographic image may be mapped on the first projection surface given that the first projection point on the first projection surface and the first point on the first photographic image are point symmetric to the first optical axis. In determining the 3D location of the first projection point, the direction of the first optical axis may be used to determine an orientation of the first projection surface at the time the first photographic image was taken as the direction of the first optical axis is perpendicular to the first projection surface. In determining the 3D location of the first projection point, the 3D location of the first optical center and the first distance may be used to provide a 3D location of the first projection surface in the 3D space, wherein the 2D location of the first projection point on the first projection surface and the 3D location of the first projection surface are processed to provide the 3D location of the first projection point in the 3D space.

Further in the foregoing method, processing to compute the 3D location of the first projection point on the imaginary plane parallel to the first projection surface may comprise:
processing the first photographic image to determine a 2D size of the first photographic image;
processing the first photographic image to determine a 2D location of the first point on the first photographic image;
subsequently, processing the 2D size of the first projection surface, the 2D size of the first photographic image, and the 2D location of the first point on the first photographic image, the first distance, and an imaginary projection distance between the imaginary plane and the first optical center in the first optical axis to determine a 2D location of the first projection point on the imaginary plane parallel to the first projection surface that corresponds to the first point on the first photographic image; and
subsequently, processing the direction of the first optical axis, the 3D location of the first optical center, the first distance, and the 2D location of the first projection point on the imaginary plane parallel to the first projection surface to determine the 3D location of the first projection point at which the first feature would have been projected on the imaginary plane parallel to the first projection surface at the time the first photographic image was taken,
wherein the 2D location defines a location relative to a reference point in a 2D plane,
wherein in determining the 2D location of the first projection point on the imaginary plane, the first distance and the imaginary projection distance are used to provide a first ratio therebetween, and the 2D size of the first projection surface and the first ratio are used to provide a 2D size of the imaginary plane,
wherein the 2D size of the imaginary plane and the 2D size of the first photographic image are used to provide a second ratio therebetween,
wherein determining the 2D location of the first projection point on the first projection surface further comprises mapping the first point on the first photographic image on the imaginary plane in view of the second ratio between the 2D size of the imaginary plane and the 2D size of the first photographic image,
wherein the first point on the first photographic image is mapped on the imaginary plane given that, the first projection point on the imaginary plane and the first point on the first photographic image are point symmetric to the first optical axis.

In the foregoing method, when the first imaginary straight line and the second imaginary straight line cross, the first feature may be a point where the first imaginary straight line and the second imaginary straight line cross in the 3D space. When the first imaginary straight line and the second imaginary straight line do not cross, computing the 3D location of the first feature may comprise: determining a shortest straight line interconnecting between the first imaginary straight line the second imaginary straight line; and determining the first feature in the 3D space using the shortest straight line.

Another aspect of the invention provides a method of producing a 3D computer model of a building, the method may comprise: producing the 3D computer model of the first room according to the foregoing method; and producing a 3D computer model of a second room adjacent to the first room in the building. Producing the 3D computer model of the first room and the 3D computer model of the second room may be performed sequentially. Producing the 3D computer model of the first room and the 3D computer model of the second room may be performed simultaneously.

One or more embodiments relate to an apparatus and method of three-dimensional reverse modeling of a building structure by using photographic images, in which three-dimensional modeling data of a building structure may be quickly and easily reversely modeled at low costs by using photographic images of the building structure.

Additional aspects will be set forth in part in the description which follows and, in part, will be apparent from the description, or may be learned by practice of the presented embodiments.

According to one or more embodiments, a method of three-dimensional reverse modeling of a building structure by using photographic images, includes: (a) receiving, by a photographic image module, a plurality of captured photographic images of a building structure and storing the photographic images; (b) achieving, by a camera information module, a camera direction corresponding to a direction from which the plurality of photographic images are captured and a camera position corresponding to locations of a projection center point, as camera information; (c) receiving, by a two-dimensional construction module, a two-dimensional drawing for copying objects in the building structure by using an inputting device and displaying the two-dimensional drawing on a display device as a plan view; (d) converting, by a three-dimensional conversion module, the two-dimensional drawing displayed by the two-dimensional construction module in (c), into a three-dimensional model; (e) overlapping a photographic image of the three-dimensional model projected onto a camera projection surface by using the camera information, with at least one of the plurality of photographic images and displaying, by a three-dimensional display module, the overlapped image on the display device; and (f) receiving, by the two-dimensional construction module, by using an inputting device, a two-dimensional drawing for correcting the two-dimensional drawing of (c) by using the overlapped image displayed by the three-dimensional display module in (e), and performing (c), (d), and (e) again.

In the foregoing method, (b) may comprise calculating, by the camera information module, the camera information corresponding to the plurality of photographic images by using a computer vision structure from motion (SfM) method. In the foregoing method, (b) may comprise calculating, by the camera information module, the camera information corresponding to the plurality of photographic images by using measurement values of an inertial measurement unit (IMU), stored together when the plurality of photographic images are captured.

The foregoing method may further comprise (g) receiving, by a reference point module, locations of a reference point used in constructing the two-dimensional drawing in (c), wherein (c) comprises projecting, by the two-dimensional construction module, the reference point onto a two-dimensional plane to display the reference point on the display device. Still in foregoing method, (g) may comprise (g-1) receiving, by the reference point module, locations of the reference point marked on each of at least two of the plurality of photographic images, as photographic image locations; (g-2) calculating, by the reference point module, locations of a projection point corresponding to a location on which the reference point is displayed on a projection surface of a camera arranged according to camera information corresponding to the plurality of photographic images, by using the photographic image locations; (g-3) calculating, by the reference point module, imaginary straight lines connecting each projection point of the plurality of photographic images and a camera position of the camera information; and (g-4) determining, by the reference point module, locations of a point in an area that is at a shortest distance from the imaginary straight lines, as three-dimensional locations of the reference point.

In the foregoing method, (g-4) may comprise determining, by the reference point module, three-dimensional locations of the reference point by using locations of points that are at an equal and shortest distance from each of two imaginary straight lines selected from among the imaginary straight lines, according to statistical standards. In the foregoing method, (g-4) may comprise determining, by the reference point module, an average value of locations of points that are at an equal and shortest distance from each of two imaginary straight lines selected from among the imaginary straight lines, as the three-dimensional locations of the reference point. In the foregoing method, (g) may comprise receiving, by the reference point module, locations of the reference point by receiving, as the appointed reference point, a point that is commonly marked on at least two photographic images displayed on the display device from among the plurality of photographic images, by using an inputting device. In the foregoing method (g) may comprise receiving, by the reference point module, locations of the reference point by receiving, as the appointed reference point, a point that is commonly marked on at least two photographic images displayed on the display device from among the plurality of photographic images, by using an inputting device.

Further, in the foregoing method, (g) may comprise receiving, by the reference point module, locations of the reference point by locations of the reference point by receiving, as the appointed reference point, a point that is commonly marked on at least two photographic images displayed on the display device from among the plurality of photographic images, by using an inputting device. Yet in the foregoing method, (g) may comprise receiving, by the reference point module, locations of the reference point by receiving, as the appointed reference point, a point that is commonly marked on at least two photographic images displayed on the display device from among the plurality of photographic images, by using an inputting device.

According to one or more embodiments, an apparatus for three-dimensional reverse modeling of a building structure by using photographic images, includes: a photographic image module receiving and storing a plurality of captured photographic images of a building structure; a camera information module achieving, as camera information, a camera direction corresponding to a direction from which the plurality of photographic images are captured and a camera position corresponding to locations of a projection center point; a two-dimensional construction module receiving a two-dimensional drawing for copying objects in the building structure by using an inputting device and displaying the two-dimensional drawing on a display device as a plan view; a three-dimensional conversion module converting the two-dimensional drawing displayed by the two-dimensional construction module into a three-dimensional model; and a three-dimensional display module overlapping a photographic image of the three-dimensional model projected onto a camera projection surface by using the camera information, with at least one of the plurality of photographic images and displaying the overlapped image on the display device.

One or more embodiments relate to a three-dimensional locations calculating apparatus using photographic images and a three-dimensional location calculation method by using photographic images, in which a plurality of photographic images are analyzed to calculate three-dimensional locations of a point that is commonly marked on the photographic images.

One or more embodiments relate to a three-dimensional distance measuring apparatus using photographic images and a three-dimensional distance measurement method by using photographic images, and more particularly, to a three-dimensional distance measuring apparatus and a three-dimensional distance measurement method by using photographic images, in which a plurality of photographic images are analyzed to calculate three-dimensional locations of a point that is commonly marked on the photographic images and calculate a distance between two points based on a result of the calculation of the three-dimensional locations of the point marked on the photographic images.

One or more embodiments provide a three-dimensional locations calculating apparatus using photographic images and a three-dimensional locations calculation method by using photographic images, in which three-dimensional locations of arbitrary points marked on photographic images captured using a camera may be calculated using the photographic images.

One or more embodiments provide a three-dimensional distance measuring apparatus using photographic images and a three-dimensional distance measurement method by using photographic images, in which a distance between two points may be measured by calculating three-dimensional locations of arbitrary points marked on photographic images captured using a camera, by using the photographic images.

Additional aspects will be set forth in part in the description which follows and, in part, will be apparent from the description, or may be learned by practice of the presented embodiments.

According to one or more embodiments, a method of calculating three-dimensional locations by using photographic images, in which three-dimensional locations of a target position that is commonly marked on a plurality of photographic images captured using a camera are calculated by using the plurality of photographic images, wherein the method includes: (a) receiving, by a photographic image locations module, locations of the target position on each of the plurality of photographic images marked on the plurality of photographic images, as image locations; (b) achieving, by a camera information module, as camera information, a camera direction corresponding to a direction in which the plurality of photographic images are captured and a camera position corresponding to locations of a projection center point; (c) calculating, by a projection point calculation module, locations of a projection point corresponding to a position where the target position is marked on a projection surface of the camera placed based on the camera information corresponding to the plurality of photographic images, by using the image locations; (d) respectively calculating, by an imaginary straight line calculation module, imaginary straight lines respectively connecting the projection points of the plurality of photographic images to the camera position of the camera information; and (e) determining, by a target position calculation module, locations of a point in a region where a distance between the point and the imaginary straight lines is shortest, as three-dimensional locations of the target position.

According to one or more embodiments, a method of measuring a three-dimensional distance by using photographic images, a distance between target positions marked on a plurality of photographic images captured using a camera are calculated by using the plurality of photographic images, is provided, wherein the method includes: (a) receiving, by an image locations module, locations of the target position on each of the plurality of photographic images marked on the plurality of photographic images, as image locations; (b) achieving, by a camera information module, as camera information, a camera direction corresponding to a direction in which the plurality of photographic images are captured and a camera position corresponding to locations of a projection center point; (c) calculating, by a projection point calculation module, locations of a projection point corresponding to a position where the target position is marked on a projection surface of the camera placed based on the camera information corresponding to the plurality of photographic images, by using the image locations; (d) respectively calculating, by an imaginary straight line calculation module, imaginary straight lines respectively connecting the projection points of the plurality of photographic images to the camera position of the camera information; and (e) determining, by a target position calculation module, locations of a point in a region where a distance between the point and the imaginary straight lines is shortest, as three-dimensional locations of the target position; (f) respectively calculating three-dimensional locations of a first target position and a second target position by using (a) through (e); (g) acquiring an absolute scale, by which a scale module converts a relative distance into an absolute distance; and (h) calculating, by a distance calculation module, an absolute distance between the first target position and the second target position by using the absolute scale.

According to one or more embodiments, a three-dimensional locations calculating apparatus using photographic images, in which three-dimensional locations of a target position that is commonly marked on a plurality of photographic images captured using a camera are calculated by using the plurality of photographic images, is provided, wherein the three-dimensional locations calculating apparatus includes: an image locations module receiving locations of the target position on each of the plurality of photographic images marked on the plurality of photographic images, as image locations; a camera information module achieving, as camera information, a camera direction corresponding to a direction in which the plurality of photographic images are captured and a camera position corresponding to locations of a projection center point; a projection point calculation module calculating locations of a projection point corresponding to a position where the target position is marked on a projection surface of the camera placed based on the camera information corresponding to the plurality of photographic images, by using the image locations; an imaginary straight line calculation module respectively calculating imaginary straight lines respectively connecting the projection points of the plurality of photographic images to the camera position of the camera information; and a target position calculation module determining locations of a point in a region where a distance between the point and the imaginary straight lines is shortest, as three-dimensional locations of the target position.

According to one or more embodiments, a three-dimensional distance measuring apparatus using photographic images, in which a distance between a first target position and a second target position from among target positions that are commonly marked on a plurality of photographic images captured using a camera is calculated by using the plurality of photographic images, is provided, wherein the three-dimensional distance measuring apparatus includes: a scale module acquiring an absolute scale, by which a relative distance is converted into an absolute distance; an image locations module receiving locations of the target positions on each of the plurality of photographic images marked on the plurality of photographic images, as image locations; a camera information module achieving, as camera information, a camera direction corresponding to a direction in which the plurality of photographic images are captured and a camera position corresponding to locations of a projection center point; a projection point calculation module calculating locations of a projection point corresponding to a position where the target position is marked on a projection surface of the camera placed based on the camera information corresponding to the plurality of photographic images, by using the image locations; a calculation module respectively calculating imaginary straight lines respectively connecting the projection points of the plurality of photographic images to the camera position of the camera information; a target position calculation module determining locations of a point in a region where a distance between the point and the imaginary straight lines is shortest, as three-dimensional locations of the target position; and a distance calculation module calculating an absolute distance between the first target position and the second target position by using three-dimensional locations of the first and second target positions calculated using the image locations module, the camera information module, the projection point calculation module, the calculation module, and the target position calculation module and the absolute scale acquired using the scale module.

According to one or more embodiments, a method of processing two or more different photographs to determine a three-dimensional location of a feature commonly captured in the two or more different photographs, the method comprising: inputting, to a computerized system, a first photographic image of a place taken by a first camera or first data representing the first photographic image; inputting, to the computerized system, a second photographic image of the place taken by a second camera or second data representing the second photographic image; providing, to the computerized system, a three-dimensional (3D) location (or 3D coordinate) of a first optical center of the first camera at the time the first photographic image was taken; providing, to the computerized system, a 3D location of a second optical center of the second camera at the time the second photographic image was taken; providing, to the computerized system, a direction of a first optical axis of the first camera at the time the first photographic image was taken; providing, to the computerized system, a direction of a second optical axis of the second camera at the time the second photographic image was taken; providing, to the computerized system, a two-dimensional (2D) size of a first projection surface, on which an optical image is projected inside the first camera for capturing the optical image, or information leading to the 2D size of the first projection surface of the first camera; providing, to the computerized system, a 2D size of a second projection surface, on which an optical image is projected inside the second camera for capturing the optical image, or information leading to the 2D size of the second projection surface of the second camera; providing, to the computerized system, a first distance between the first optical center and the first projection surface along the first optical axis or information leading to the first distance of the first camera; providing, to the computerized system, a second distance between the second optical center and the second projection surface along the second optical axis or information leading to the second distance of the second camera; selecting, on the first photographic image displayed on at least one display screen of the computerized system, a first point representing a target position of the place, a 3D location of which is to be determined; selecting, on the second photographic image displayed on the at least one display screen of the computerized system, a second point representing the target position; and causing at least one processor of the computerized system to execute computer software stored in at least one memory of the computerized system to perform the following: processing the first photographic image, the 2D size of the first projection surface, the direction of the first optical axis, and the first distance to compute a 3D location of a first projection point at which the target position of the place would have been projected on the first projection surface, or on an imaginary plane parallel to the first projection surface, at the time the first photographic image was taken by the first camera, processing the second photographic image, the 2D size of the second projection surface, the direction of the second optical axis, and the second distance to compute a 3D location of a second projection point at which the target position of the place would have been projected on the second projection surface, or an imaginary plane parallel to the second projection surface, at the time the second photographic image was taken by the second camera, and processing the 3D location of the first projection point, the 3D location of the first optical center, the 3D location of the second projection point, and the 3D location of the second optical center to compute the 3D location of the target position of the place as a first imaginary straight line passing the 3D location of the first projection point and the 3D location of the first optical center would also pass or pass by the target position and further a second imaginary straight line passing the 3D location of the second projection point and the 3D location of the second optical center would also pass or pass by the target position such that the first imaginary straight line and the second imaginary straight line cross or are close to each other at or near the target position, wherein the 3D location defines a location relative to a reference point in a 3D space.

According to one or more embodiments, a method of processing two or more different photographs to determine a three-dimensional location of a feature commonly captured in the two or more different photographs, wherein the second camera is the first camera or another camera, wherein the first photographic image and the second photographic image are two-dimensional images of the place and taken from different locations of the place such that some features of the place are depicted in both of the first photographic image and the second photographic image.

According to one or more embodiments, a method of processing two or more different photographs to determine a three-dimensional location of a feature commonly captured in the two or more different photographs, wherein processing to compute the 3D location of the first projection point on the first projection surface comprises: processing the first photographic image to determine a 2D size of the first photographic image; processing the first photographic image to determine a 2D location (or 2D coordinate) of the first point on the first photographic image; subsequently, processing the 2D size of the first projection surface, the 2D size of the first photographic image, and the 2D location of the first point on the first photographic image to determine a 2D location (or 2D coordinate) of the first projection point on the first projection surface that corresponds to the first point on the first photographic image; and subsequently, processing the direction of the first optical axis, the 3D location of the first optical center, the first distance, and the 2D location of the first projection point on the first projection surface to determine the 3D location of the first projection point at which the target position would have been projected on the first projection surface at the time the first photographic image was taken, wherein the 2D location defines a location relative to a reference point in a 2D plane.

According to one or more embodiments, a method of processing two or more different photographs to determine a three-dimensional location of a feature commonly captured in the two or more different photographs, wherein in determining the 2D location of the first projection point on the first projection surface, the 2D size of the first projection surface and the 2D size of the first photographic image are used to provide a ratio therebetween.

According to one or more embodiments, a method of processing two or more different photographs to determine a three-dimensional location of a feature commonly captured in the two or more different photographs, wherein determining the 2D location of the first projection point on the first projection surface further comprises mapping the first point on the first photographic image on the first projection surface in view of the ratio between the 2D size of the first projection surface and the 2D size of the first photographic image.

According to one or more embodiments, a method of processing two or more different photographs to determine a three-dimensional location of a feature commonly captured in the two or more different photographs, wherein the first point on the first photographic image is mapped on the first projection surface given that the first projection point on the first projection surface and the first point on the first photographic image are point symmetric to the first optical axis.

According to one or more embodiments, a method of processing two or more different photographs to determine a three-dimensional location of a feature commonly captured in the two or more different photographs, wherein in determining the 3D location of the first projection point, the direction of the first optical axis is used to determine an orientation of the first projection surface at the time the first photographic image was taken as the direction of the first optical axis is perpendicular to the first projection surface.

According to one or more embodiments, a method of processing two or more different photographs to determine a three-dimensional location of a feature commonly captured in the two or more different photographs, wherein in determining the 3D location of the first projection point, the 3D location of the first optical center and the first distance are used to provide a 3D location of the first projection surface in the 3D space.

According to one or more embodiments, a method of processing two or more different photographs to determine a three-dimensional location of a feature commonly captured in the two or more different photographs, wherein the 2D location of the first projection point on the first projection surface is added to the 3D location of the first projection surface to provide the 3D location of the first projection point in the 3D space.

According to one or more embodiments, a method of processing two or more different photographs to determine a three-dimensional location of a feature commonly captured in the two or more different photographs, wherein processing to compute the 3D location of the second projection point comprises: processing the second photographic image to determine a 2D size of the second photographic image; processing the second photographic image to determine a 2D location (or 2D coordinate) of the second point on the second photographic image; subsequently, processing the 2D size of the second projection surface, the 2D size of the second photographic image, and the 2D location of the second point on the second photographic image to determine a 2D location (or 2D coordinate) of the second projection point on the second projection surface that corresponds to the second point on the second photographic image; and subsequently, processing the direction of the second optical axis, the 3D location of the second optical center, the second distance, and the 2D location of the second projection point on the second projection surface to determine the 3D location of the second projection point at which the target position would have been projected on the second projection surface at the time the second photographic image was taken, wherein the 2D location defines a location relative to a reference point in a 2D plane.

According to one or more embodiments, a method of processing two or more different photographs to determine a three-dimensional location of a feature commonly captured in the two or more different photographs, wherein processing to compute the 3D location of the first projection point on the imaginary plane parallel to the first projection surface comprises: processing the first photographic image to determine a 2D size of the first photographic image; processing the first photographic image to determine a 2D location of the first point on the first photographic image; subsequently, processing the 2D size of the first projection surface, the 2D size of the first photographic image, and the 2D location of the first point on the first photographic image, the first distance, and a third distance between the imaginary plane and the first optical center in the first optical axis to determine a 2D location of the first projection point on the imaginary plane parallel to the first projection surface that corresponds to the first point on the first photographic image; and subsequently, processing the direction of the first optical axis, the 3D location of the first optical center, the first distance, and the 2D location of the first projection point on the imaginary plane parallel to the first projection surface to determine the 3D location of the first projection point at which the target position would have been projected on the imaginary plane parallel to the first projection surface at the time the first photographic image was taken, wherein the 2D location defines a location relative to a reference point in a 2D plane.

According to one or more embodiments, a method of processing two or more different photographs to determine a three-dimensional location of a feature commonly captured in the two or more different photographs, wherein in determining the 2D location of the first projection point on the imaginary plane, the first distance and the third distance are used to provide a first ratio therebetween, and the 2D size of the first projection surface and the first ratio are used to provide a 2D size of the imaginary plane.

According to one or more embodiments, a method of processing two or more different photographs to determine a three-dimensional location of a feature commonly captured in the two or more different photographs, wherein the 2D size of the imaginary plane and the 2D size of the first photographic image are used to provide a second ratio therebetween.

According to one or more embodiments, a method of processing two or more different photographs to determine a three-dimensional location of a feature commonly captured in the two or more different photographs, wherein determining the 2D location of the first projection point on the first projection surface further comprises mapping the first point on the first photographic image on the imaginary plane in view of the second ratio between the 2D size of the imaginary plane and the 2D size of the first photographic image.

According to one or more embodiments, a method of processing two or more different photographs to determine a three-dimensional location of a feature commonly captured in the two or more different photographs, wherein the first point on the first photographic image is mapped on the imaginary plane given that, the first projection point on the imaginary plane and the first point on the first photographic image are point symmetric to the first optical axis.

According to one or more embodiments, a method of processing two or more different photographs to determine a three-dimensional location of a feature commonly captured in the two or more different photographs, wherein when the first imaginary straight line and the second imaginary straight line cross, the target position is a point where the first imaginary straight line and the second imaginary straight line cross in the 3D space.

According to one or more embodiments, a method of processing two or more different photographs to determine a three-dimensional location of a feature commonly captured in the two or more different photographs, wherein when the first imaginary straight line and the second imaginary straight line do not cross, computing the 3D location of the target position comprises: determining a shortest straight line interconnecting between the first imaginary straight line the second imaginary straight line; and determining the target position in the 3D space using the shortest straight line.

According to one or more embodiments, a method of processing two or more different photographs to determine a three-dimensional location of a feature commonly captured in the two or more different photographs, further comprising: inputting, to the computerized system, a third photographic image of a place taken by a third camera or third data representing the third photographic image; wherein the third camera is the first camera, the second camera or another camera, wherein the third photographic image is a two-dimensional image of the place and taken from a different location from the first and second photographic images such that some features of the place are depicted in the first photographic image, the second photographic image and the third photographic image; providing, to the computerized system, a 3D location of a third optical center of the third camera at the time the third photographic image was taken; providing, to the computerized system, a direction of a third optical axis of the third camera at the time the third photographic image was taken; providing, to the computerized system, a 2D size of a third projection surface, on which an optical image is projected inside the third camera for capturing the optical image, or information leading to the 2D size of the third projection surface of the third camera; providing, to the computerized system, a third distance between the third optical center and the third projection surface along the third optical axis or information leading to the third distance of the third camera; selecting, on the third photographic image displayed on at least one display screen of the computerized system, a third point representing the target position; and causing at least one processor of the computerized system to execute computer software stored in at least one memory of the computerized system to perform the following: processing the third photographic image, the 2D size of the third projection surface, the direction of the third optical axis, and the third distance to compute a 3D location of a third projection point at which the target position of the place would have been projected on the third projection surface, or on an imaginary plane parallel to the third projection surface, at the time the third photographic image was taken by the third camera, processing the 3D location of the first projection point, the 3D location of the first optical center, the 3D location of the second projection point, the 3D location of the second optical center, the 3D location of the third projection point, and the 3D location of the third optical center to compute the 3D location of the target position of the place as third imaginary straight line passing the 3D location of the third projection point and the 3D location of the third optical center would also pass or pass by the target position such that the third imaginary straight line and the first imaginary straight line cross or are close to each other at or near the target position and further such that the third imaginary straight line and the second imaginary straight line cross or are close to each other at or near the target position.

According to one or more embodiments, a method of processing two or more different photographs to determine a three-dimensional location of a feature commonly captured in the two or more different photographs, wherein when the third imaginary straight line and the first imaginary straight line do not cross and when the third imaginary straight line and the second imaginary straight line do not cross, computing the 3D location of the target position comprises: determining a first shortest straight line interconnecting between the first imaginary straight line the second imaginary straight line; determining a second shortest straight line interconnecting between the second imaginary straight line the third imaginary straight line; determining a third shortest straight line interconnecting between the third imaginary straight line the first imaginary straight line; and determining the target position in the 3D space using the first shortest straight line, the second shortest straight line, and the third shortest straight line.

According to one or more embodiments, a method of processing two or more different photographs to determine a three-dimensional location of a feature commonly captured in the two or more different photographs, wherein the target position is determined within a space defined by the first shortest straight line, the second shortest straight line, and the third shortest straight line.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, a method of three-dimensional reverse modeling of a building structure by using photographic images and an apparatus for three-dimensional reverse modeling of a building structure by using photographic images, according to an embodiment of the present disclosure, will be described in detail with reference to the attached drawings.

In a method of using point cloud data, a three-dimensional model may be completed by acquiring high-density point cloud from a number of photographic images and semi-automatically extracting elements of a building corresponding to a floor, wall, ceiling, or the like from the high-density point cloud data. However, when using point cloud data, it takes a long time and costs to acquire point cloud data. Also, as the point cloud data is large in size (typically millions to tens of millions of points), expensive specialized software operated on high-specification computers and skilled specialists capable of operating the software are required.

Thus, if three-dimensional modeling data of a building structure is easily and quickly reversely modeled by using photographic images of the building without requiring high costs and long time, the productivity of the manufacture of BIM of existing building structures will be increased.

Figure 1:
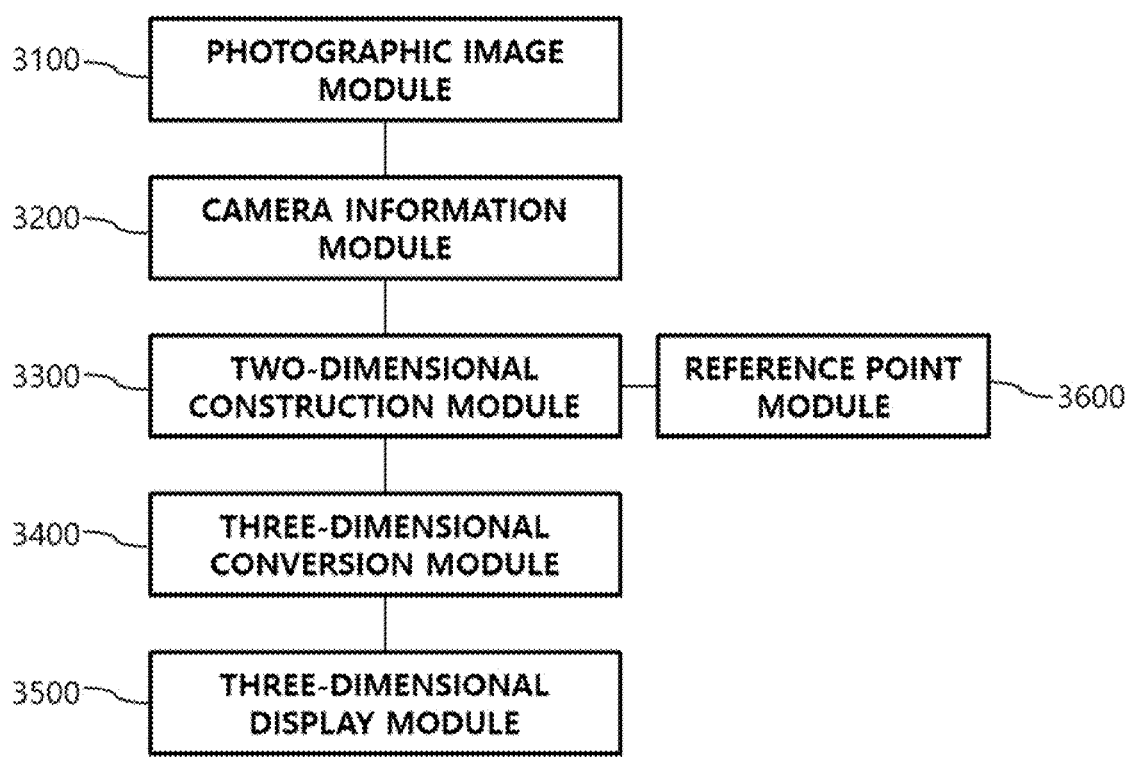
FIG. 1 is a block diagram of an apparatus for three-dimensional reverse modeling of a building structure by using photographic images, according to an embodiment of the present disclosure.
Figure 2:
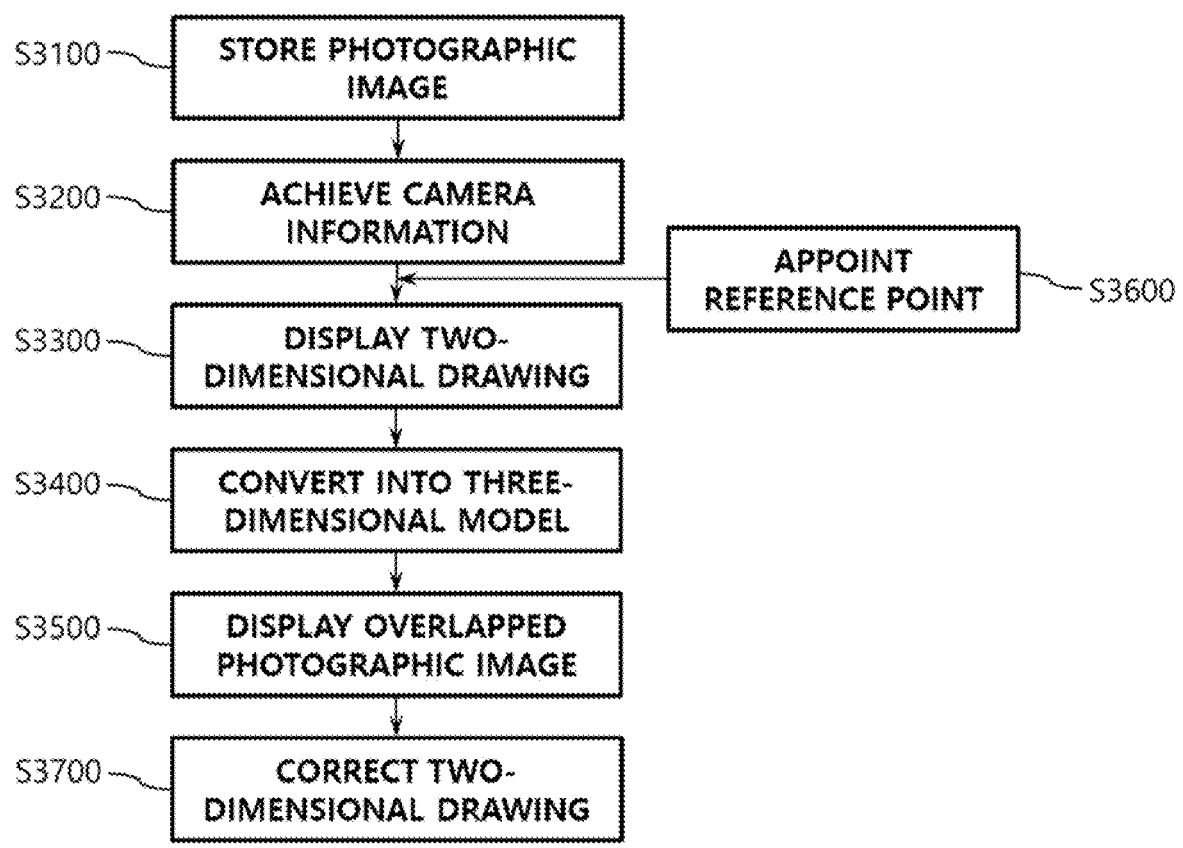
FIG. 2 is a flowchart of a method of three-dimensional reverse modeling of a building structure by using photographic images, according to an embodiment of the present disclosure.

FIG. 1 is a block diagram of an apparatus for three-dimensional reverse modeling a building structure by using photographic images, according to an embodiment of the present disclosure. FIG. 2 is a flowchart of a method of three-dimensional reverse modeling of a building structure by using photographic images, according to an embodiment of the present disclosure.

The apparatus and method of three-dimensional reverse modeling of a building structure by using photographic images, according to the present disclosure, are directed to generation of three-dimensional modeling data of a building structure by reverse modeling by using a plurality of photographic images of the building structure and positions and directions in which the photographic images are captured.

Referring to FIG. 1, the apparatus for three-dimensional reverse modeling of a building structure by using photographic images, according to the present embodiment, includes a photographic image module 3100, a camera information module 3200, a two-dimensional construction module 3300, a three-dimensional conversion module 3400, and a three-dimensional display module 3500.

The photographic image module 3100 receives and stores a plurality of photographic images of a building structure taken to generate a three-dimensional model (step (a); S3100). Photographic images of a building structure taken from various points and in various directions may be used. Photographic images of the interior and exterior parts of a building structure taken from different directions by moving a digital camera to various points may be used. The photographic images stored in the photographic image module 3100 are not limited to those taken using a typical digital camera, but may also be photographic images captured using a digital device such as a mobile phone. Photographic images acquired with three-dimensional scan data by using a three-dimensional scanner or image information in the form of photographs extracted from three-dimensional scan data may also be used as photographic images to be stored by the photographic image module 3100.

The camera information module 3200 achieves a camera direction and a camera position in which the photographic images stored in the photographic image module 3100 are captured, as camera information (step (b); step S3200). A camera direction or a direction of an optical axis refers to a direction from which a camera captures each of photographic images. A camera position or a location of an optical center refers to locations of a projection center point of a camera when the camera captures a photographic image.

The camera information module 3200 may achieve camera information by using various methods.

First, the camera information module 3200 may achieve camera information by using a computer vision structure from motion (SfM) method. The computer vision SfM method is a technique of calculating three-dimensional locations and a direction of a camera when the camera is taking pictures by analyzing just photographic images of the pictures.

Second, when capturing a photographic image by using a camera, camera information may be calculated based on measurement values or variation of measurement values according to time obtained using various types of sensors such as an inertial measurement unit (IMU), an acceleration sensor, a geomagnetic sensor, an angular displacement sensor or the like. For example, a variation of a displacement may be calculated by integrating an acceleration twice, and thus, camera information may be calculated accurately or quickly by using values calculated as described above.

Camera information may also be achieved using the computer vision SfM method and measurement values of various sensors in combination.

According to circumstances, an additional apparatus may store a position and direction of a camera, measured each time when a photographic image is captured, and the camera information module 3200 may use camera information stored as above.

Figure 3:
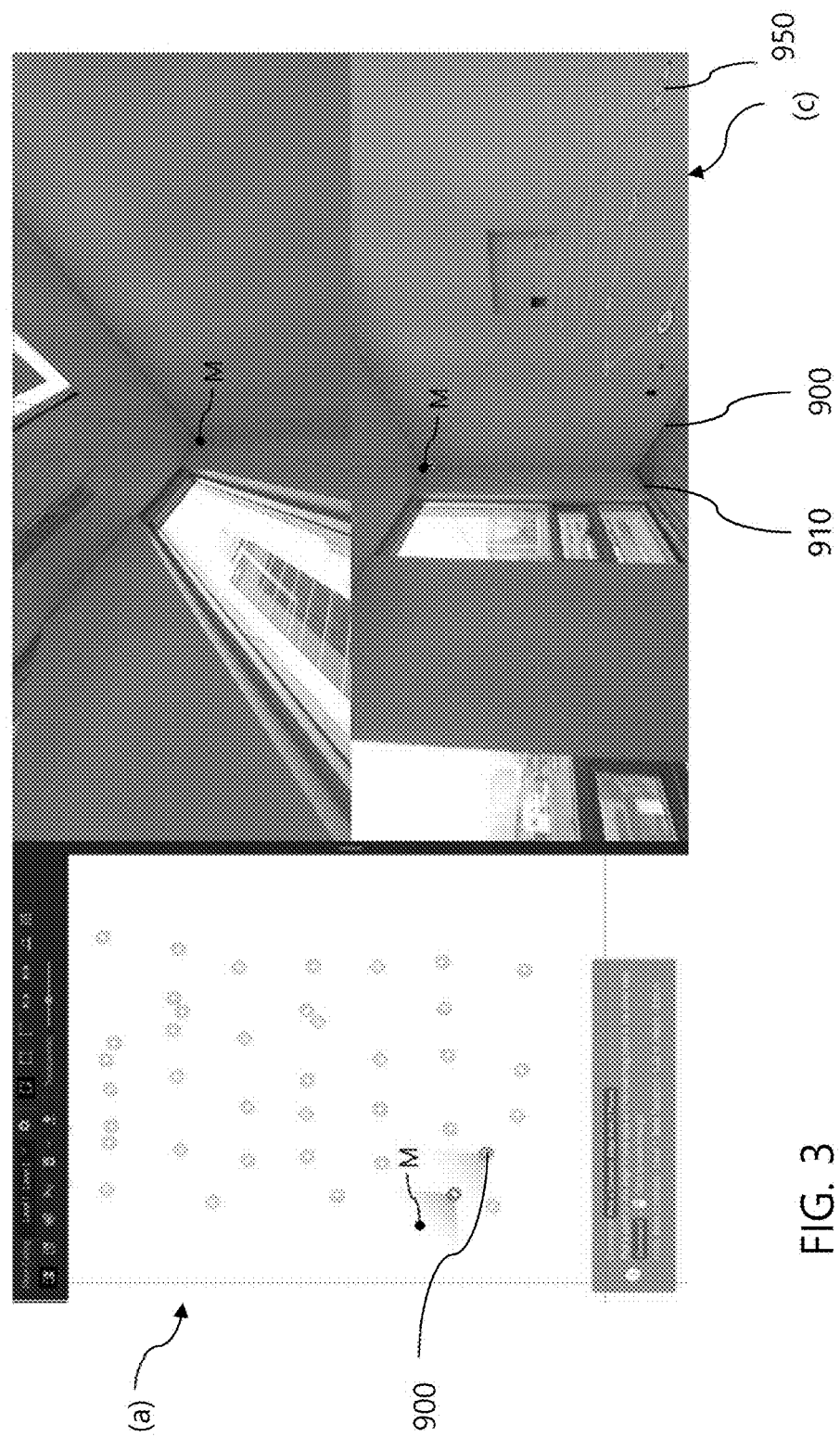
FIGS. 3 through 6 are diagrams for describing a process of performing a method of three-dimensional reverse modeling of a building structure by using photographic images by using an apparatus for three-dimensional reverse modeling of a building structure by using photographic images, according to an embodiment of the present disclosure.

The two-dimensional construction module 3300 receives, by using an inputting device, a two-dimensional drawing for copying objects in a building structure and displays the two-dimensional drawing on a display device as a plan view (step (c); S3300). In the present embodiment, as illustrated in FIG. 3, the two-dimensional construction module 3300 projects a camera position of camera information onto a plane parallel to the floor of a building structure to display the camera position as a ring-shaped mark on the display device. Referring to FIG. 3, a camera corresponding to a photographic image displayed on the right side screen of the display device displays not only a camera position but also a camera direction by using a method of displaying a field of view.

A user may construct a two-dimensional drawing for three-dimensional modeling of objects in the building structure by using the two-dimensional construction module 3300 by referring to camera positions displayed on the display device.

Figure 4:
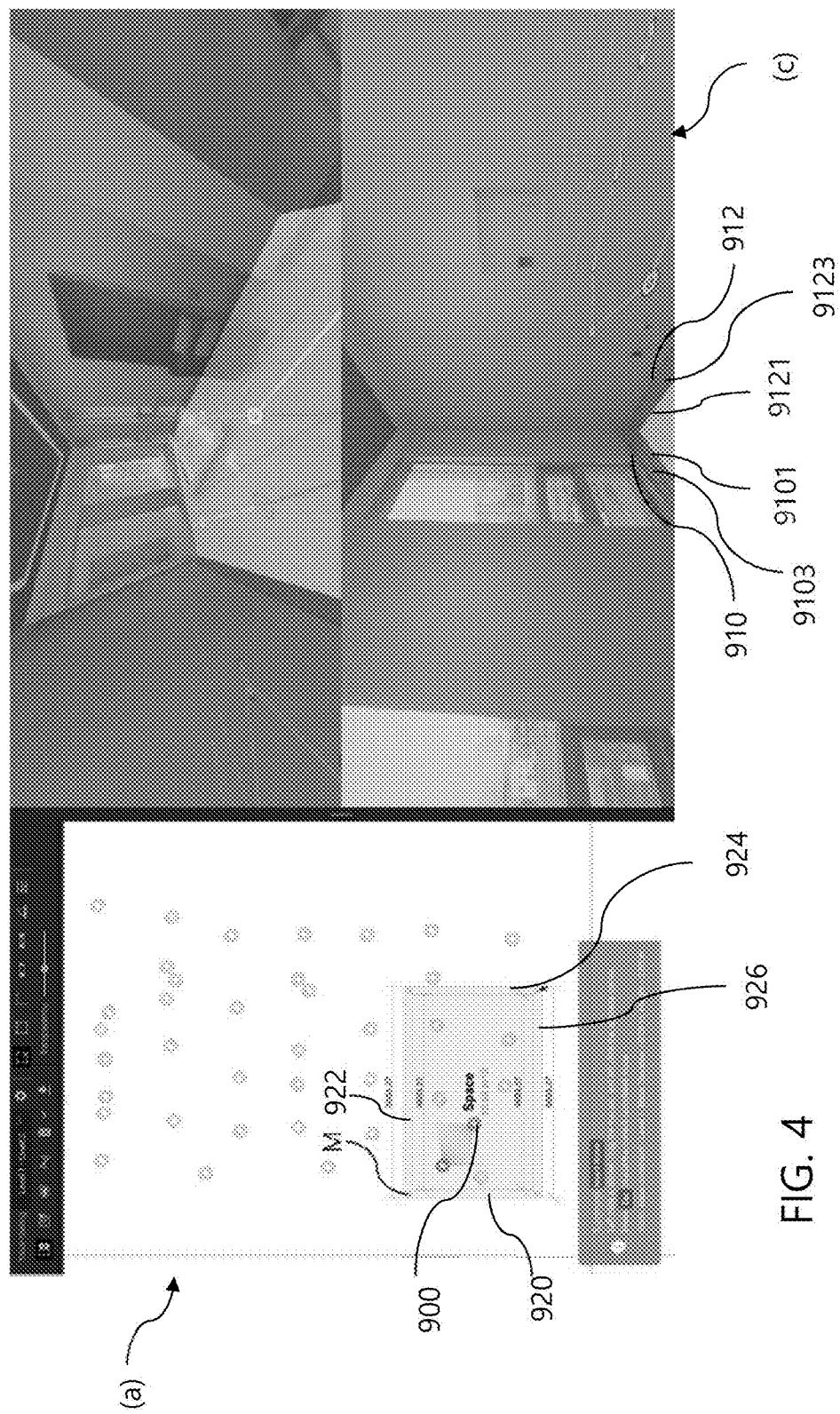

As illustrated in FIG. 4, when the user constructs a two-dimensional drawing of a wall surface of a room by using the two-dimensional construction module 3300, the three-dimensional conversion module 3400 converts the two-dimensional drawing to a three-dimensional model (step (d); S3400).

As illustrated on the right side of FIG. 4, the three-dimensional display module 3500 projects the three-dimensional model obtained by the converting by the three-dimensional display module 3500, onto a photographic image, and displays the projected image on the display device in an overlapped state (step (e); S3500).

Here, by setting a reference point M, the user may receive help when constructing a plan view by using the two-dimensional construction module 3300.

To provide a three-dimensional model by constructing a wall surface of the building structure, the user may use, as the reference point M, a point such as a corner of the building wall surface displayed on the photographic image.

To this end, according to the apparatus and method of three-dimensional reverse modeling of a building structure by using photographic images, according to the present embodiment, a reference point module 3600 is used.

The reference point module 3600 receives locations of the reference point M that may be used to construct a two-dimensional drawing by using the two-dimensional construction module 3300, from a user through an inputting device (step (g); S3600). While performing step (c), the two-dimensional construction module 3300 projects the reference point M received by the reference point module 3600, onto a two-dimensional plane to display the projected image on the display device, as illustrated in FIGS. 3 and 4.

The user may construct a plan view of an object element of a building structure such as a wall surface of a room based on the reference point M by referring to the locations of the reference point M marked on the display device. That is, a two-dimensional model of the wall surface of the room may be constructed by dragging a mouse from a position close to the reference point M displaying the corner of the wall surface, as a start point.

In the apparatus and method of three-dimensional reverse modeling of a building structure by using photographic images, according to the present embodiment, a method of calculating and displaying locations of a two-dimensional reference point by using photographic images is as follows.

The reference point module 3600 receives a point that is commonly marked on two or more photographic images from among a plurality of photographic images and is appointed as a reference point (step (g-1)). Referring to FIG. 3, the apparatus for three-dimensional reverse modeling of a building structure by using photographic images, according to the present embodiment, receives the reference point M that is appointed from two photographic images, by using an inputting device (mouse). In FIG. 3, corners of a same room are displayed on photographic images that are captured from two different camera positions. The user may move a cursor of the mouse to click points of the corners displayed on the photographic images. The reference point module 3600 receives, as locations of photographic images, the locations of the reference point on each photographic image, displayed on at least two photographic images, by using the above-described method.

The reference point module 3600 calculates three-dimensional locations of a position where the reference point is marked on a projection surface of a camera arranged in a three-dimensional space according to the camera information achieved using the camera information module 3200 (step (g-2)). Hereinafter, the reference point marked on the projection surface of the camera will be defined and described as a projection point. A projection surface of a camera corresponds to a film or an image sensor of a camera. In digital cameras, for example, a complementary metal-oxide semiconductor (CMOS) image sensor or a charge-coupled device (CCD) image sensor corresponds to a projection surface. A distance between an optical center and a projection surface of a camera and a 2D size of the projection surface correspond to camera intrinsic parameters, and thus, values of the distance between the optical center and the projection surface and the size of the projection surface may be acquired from information about the camera. By using the camera information, the 2D size and position of the projection surface, and the locations of a photographic image of the reference point, the reference point module 3600 may calculate three-dimensional locations of the reference point.

Figure 7:
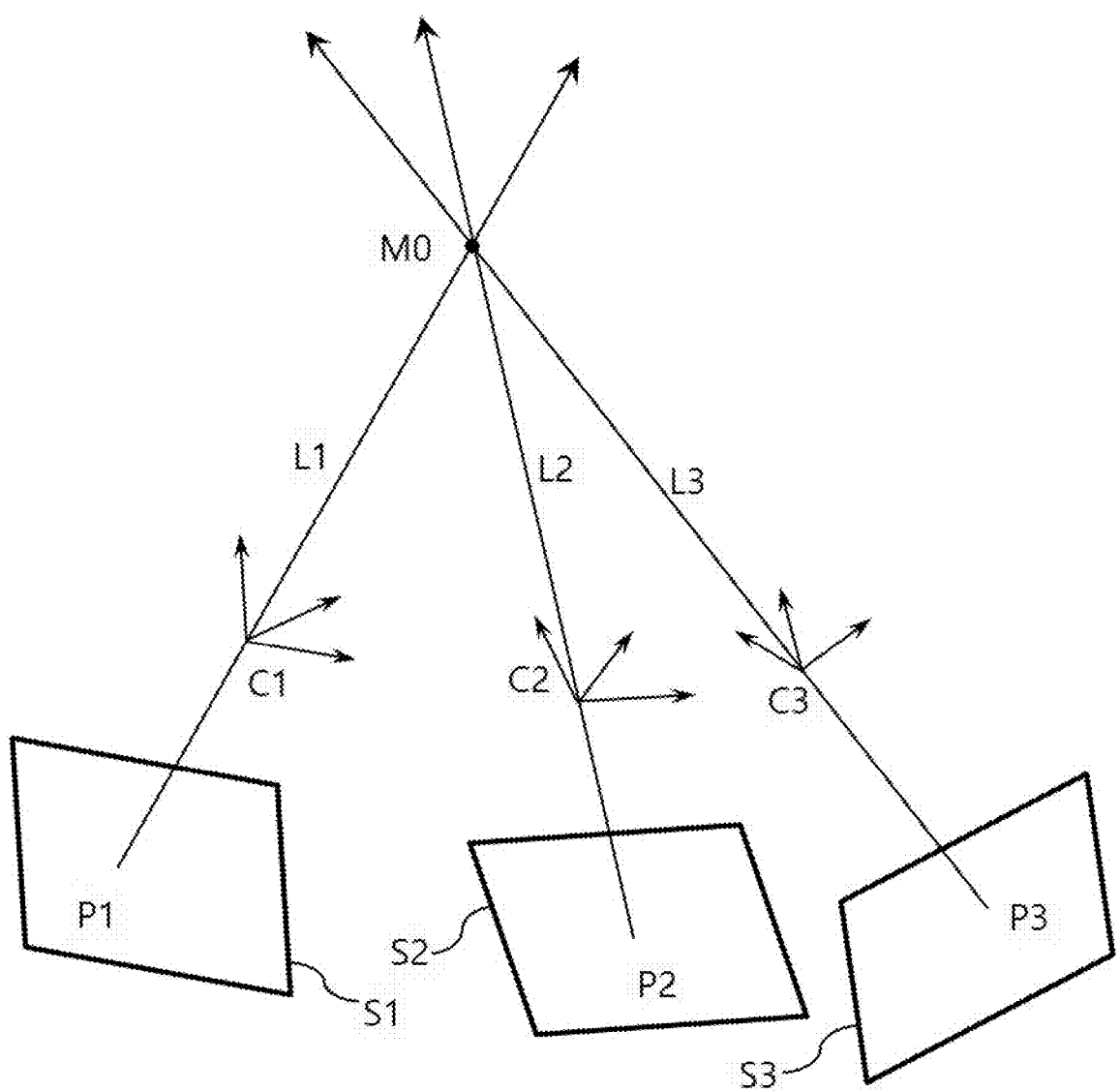
FIGS. 7 and 8 are diagrams for describing an operation of the present disclosure.
Figure 8:
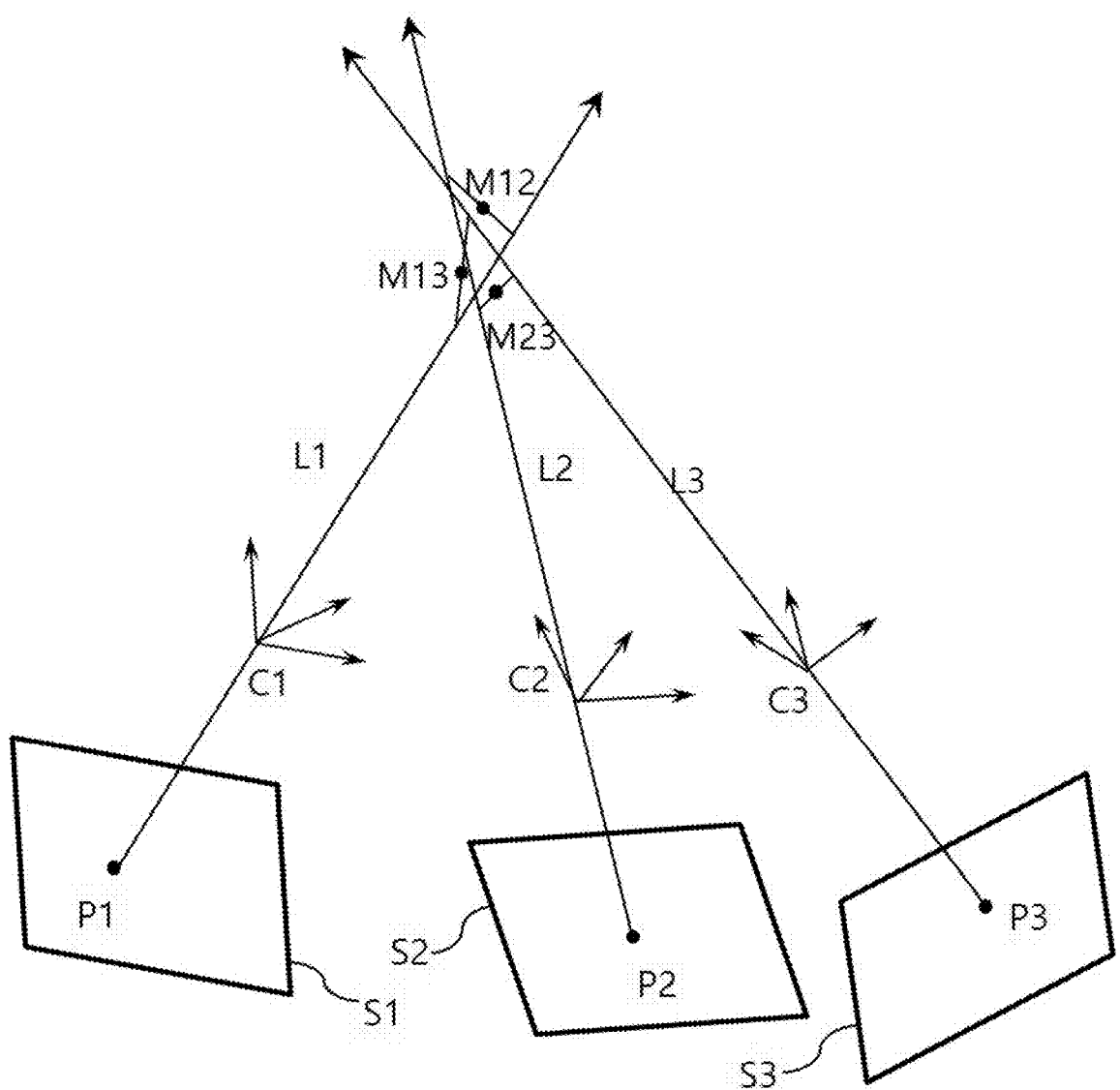

FIGS. 7 and 8 illustrate projection points P1, P2, and P3 and projection surfaces S1, S2, and S3 calculated by using a reference point M0 commonly marked on three photographic images and camera information.

While the projection surfaces S1, S2, and S3 having a rectangular shape are illustrated as an example in FIGS. 7 and 8, projection surfaces may also be curved surfaces according to circumstances. In addition, as there may be distortion between an actual subject and a photographic image projected onto a projection surface, an error may occur when mapping the reference point M0 to the projection points P1, P2, and P3 of the projection surfaces S1, S2, and S3. The reference point module 3600 may also calculate locations of the projection points P1, P2, and P3 by reducing an error in consideration of the above distortion.

The reference point module 3600 calculates imaginary straight lines L1, L2, and L3 respectively connecting the projection points P1, P2, and P3 to a camera position of camera information (projection center points (view points, 3D locations of optical center points) C1, C2, and C3) (step (g-3)). The camera information module 3200 has acquired the projection center points C1, C2, and C3 of the camera, and the reference point module 3600 has calculated the projection points P1, P2, and P3. Then the reference point module 3600 may respectively calculate the imaginary straight lines L1, L2, and L3 connecting two points in a three-dimensional space (the camera projection center points C1, C2, and C3 and the projection points P1, P2, and P3).

Referring to FIG. 7, the imaginary straight lines L1, L2, and L3 theoretically meet with each other at one point (M0). For example, the reference point M0 selected from photographic images captured at different positions correspond to a same point in the three-dimensional space, and thus, all of the straight lines connected from each position of the camera (the projection center points C1, C2, and C3) to the projection points P1, P2, and P3 pass by the same reference point M0, as illustrated in FIG. 7. According to this principle, the reference point module 3600 determines locations of a point at which the imaginary straight lines L1, L2, and L3 cross each other, as locations of the reference point M0.

When calculating the imaginary straight lines L1, L2, and L3 by using the reference point module 3600 by using photographic images actually captured using a camera, frequently, the imaginary straight lines L1, L2, and L3 may not cross each other as illustrated in FIG. 8. The apparatus for three-dimensional reverse modeling of a building structure by using photographic images, according to the present embodiment, is directed to indirectly generate three-dimensional modeling data by using two-dimensional photographic images, and thus various errors may occur during a process of estimating three-dimensional locations. For example, an error may occur when the reference point module 3600 receives photographic image locations by using a display device and an inputting device. That is, an error may occur when receiving photographic image locations of a reference point marked on each photographic image by using an inputting device. In particular, when a user clicks a reference point on each photographic image by using an inputting device such as mouse as described above, there may be error in positions clicked. An error may also occur while the camera information module 3200 achieves camera information. Various errors may be generated when the camera information module 3200 calculates camera information by using a computer SfM method or by using measurement values obtained from various sensors.

Due to the errors occurring due to various factors as described above, the imaginary straight lines L1, L2, and L3 calculated using the reference point module 3600 may not intersect with each other as illustrated in FIG. 8.

In this case, the reference point module 3600 determines three-dimensional locations of a reference point by using various mathematical or statistical methods.

For example, as illustrated in FIG. 8, two lines among the imaginary straight lines L1, L2, and L3 may be selected and segments that interconnect the imaginary straight lines L1, L2, and L3 by a shortest distance may be determined. Points M12, M13, and M23 bisecting segments as described above may be points that are at a shortest distance from the imaginary straight lines L1, L2, and L3, to which the points M12, M13, and M23 respectively correspond.

The reference point module 3600 may determine three-dimensional locations of a reference point by applying statistical standards to locations of the bisection points M12, M13, and M23 of the shortest segment as described above. That is, one of statistical representative values such as an average, an intermediate value, or a median may be determined as three-dimensional locations of a reference point. Also, a method of determining locations of a reference point by excluding an outlier that exceeds allowable limits of error, based on normal distribution and standard deviation, may be used.

In addition, the reference point module 3600 may use a method of determining three-dimensional locations of a reference point by applying various standards to points which are in a particular area in a three-dimensional space and at a shortest distance from the imaginary straight lines L1, L2, and L3.

In sum, regardless of whether the imaginary straight lines L1, L2, and L3 cross each other, the reference point module 3600 determines, as three-dimensional locations of a reference point, locations of a point in an area that is at a shortest distance from the imaginary straight lines L1, L2, and L3.

When the reference point module 3600 receives the appointed reference point M and calculates three-dimensional locations of the reference point M through the above-described process, as illustrated in FIG. 3, the two-dimensional construction module 3300 projects the reference point M onto a two-dimensional plane and displays the projected image on the display device, as illustrated in FIGS. 3 and 4. For convenience, while the description with reference to FIGS. 7 and 8 is based on a reference point marked on three photographic images, in the embodiment of FIGS. 3 and 4, locations of the reference point M is determined using two photographic images.

By referring to the reference point M displayed on the display device, the user inputs a two-dimensional drawing for copying the wall surface of the room of the building structure by using the two-dimensional construction module 3300, as illustrated in FIG. 4. The two-dimensional construction module 3300 provides a user interface as illustrated in FIG. 4 to receive a two-dimensional drawing of various building objects and displays the same on the display device as a plan view. Referring to FIG. 4, the user constructs an approximate two-dimensional plan view of a room by dragging by using a mouse cursor. The two-dimensional construction module 3300 may also provide a function of copying various building objects such as a door of a room, a window, or the like, other than the wall illustrated in FIG. 4 and constructing and displaying the building objects.

The three-dimensional conversion module 3400 converts the two-dimensional drawing received and displayed by the two-dimensional construction module 3300, into a three-dimensional model (step (d); S3400). That is, the three-dimensional conversion module 3400 generates a three-dimensional model of the wall by reflecting a height of the room in the plan view illustrated in FIG. 4. The three-dimensional conversion module 3400 may receive, from the user, information about additional dimensions to generate the three-dimensional model as needed. For example, the three-dimensional conversion module 3400 may receive, from the user, additional dimensions information such as a height of a wall, a height of a door of a room, a height of a window, or the like, and generate a three-dimensional model. The three-dimensional conversion module 3400 may also generate a three-dimensional model by setting height-direction dimensions regarding a two-dimensional plane to previously appointed reference values or arbitrary values according to circumstances. In this case, the height-direction dimensions are later corrected manually or automatically.

The three-dimensional display module 3500 overlaps the three-dimensional model generated using the three-dimensional conversion module 3400 on at least one of photographic images and displays the overlapped image (step (e); S3500). In order for the user to intuitively and easily recognize the shape of the three-dimensional model constructed by the user two-dimensionally, the three-dimensional display module 3500 projects the three-dimensional model onto a photographic image three-dimensionally and displays the projected image in an overlapped manner as illustrated in FIG. 4.

According to the apparatus and method of three-dimensional reverse modeling of a building structure by using photographic images, according to the present embodiment, as camera information regarding each photographic image is known from the camera information module 3200, an image of a three-dimensional model may be projected onto a camera projection surface and the image composited onto the photographic image may be displayed on the display device. By using the above-described method, even when an image is a two-dimensional image, the image may be displayed as a stereoscopic and intuitive image of a building structure as if a three-dimensional model is actually arranged in a three-dimensional virtual space, as illustrated in FIG. 4.

As described above, the plan view and the overlapped photographic image illustrated in FIG. 4 are based on the two-dimensional plan view that is approximately constructed by the user by referring to the reference point M. Thus, as shown in the overlapped photographic image on the right side of FIG. 4, there is difference between the shape of a model of the wall surface of the room and a photographic image of the actual shape of the room.

However, according to the present disclosure, as the user is able to intuitively identify the shape of a model of a building object constructed in the form of a two-dimensional plan view, through the overlapped photographic image, the two-dimensional plan view may be corrected easily and accurately.

Figure 5:
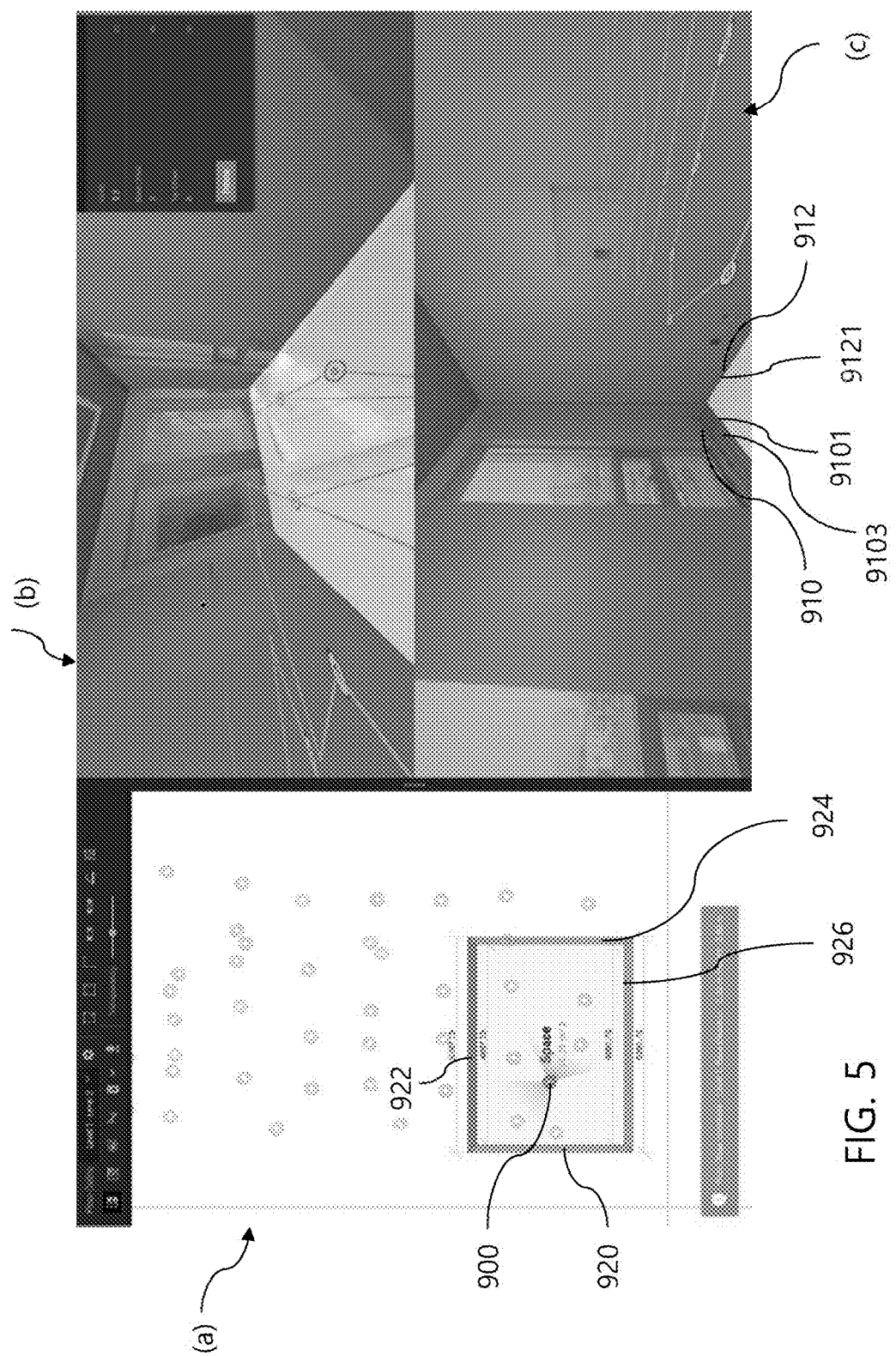

When the user corrects the plan view of the wall surface illustrated in FIG. 4 by clicking on a mouse and dragging, the two-dimensional construction module 3300 displays the corrected plan view on a screen of the display device in real time (step (f); S3700). At the same time, the three-dimensional conversion module 3400 and the three-dimensional display module 3500 convert the plan view corrected by the two-dimensional construction module 3300 into a three-dimensional model again and overlaps the three-dimensional model on the photographic image and displays the overlapped image (step (f); S3700). The user may correct the two-dimensional plan view in real time by checking, with the eyes, outlines of objects displayed on the photographic image, such as a wall, the floor, a door, a window, or the like, and the overlapped image of the three-dimensional model. The user may construct the two-dimensional plan view by simultaneously checking, in real time, changes in the dimensions of the two-dimensional plan view and changes in the shape of the three-dimensional model on the photographic image corresponding to the changes in the dimensions of the two-dimensional plan view. Thus, the user may construct a three-dimensional reverse model of a building structure easily and quickly. FIG. 5 illustrates a state where drawing of a plan view of a wall body of a room is completed in accordance with outlines of the floor of the room marked on a photographic image.

Figure 6:
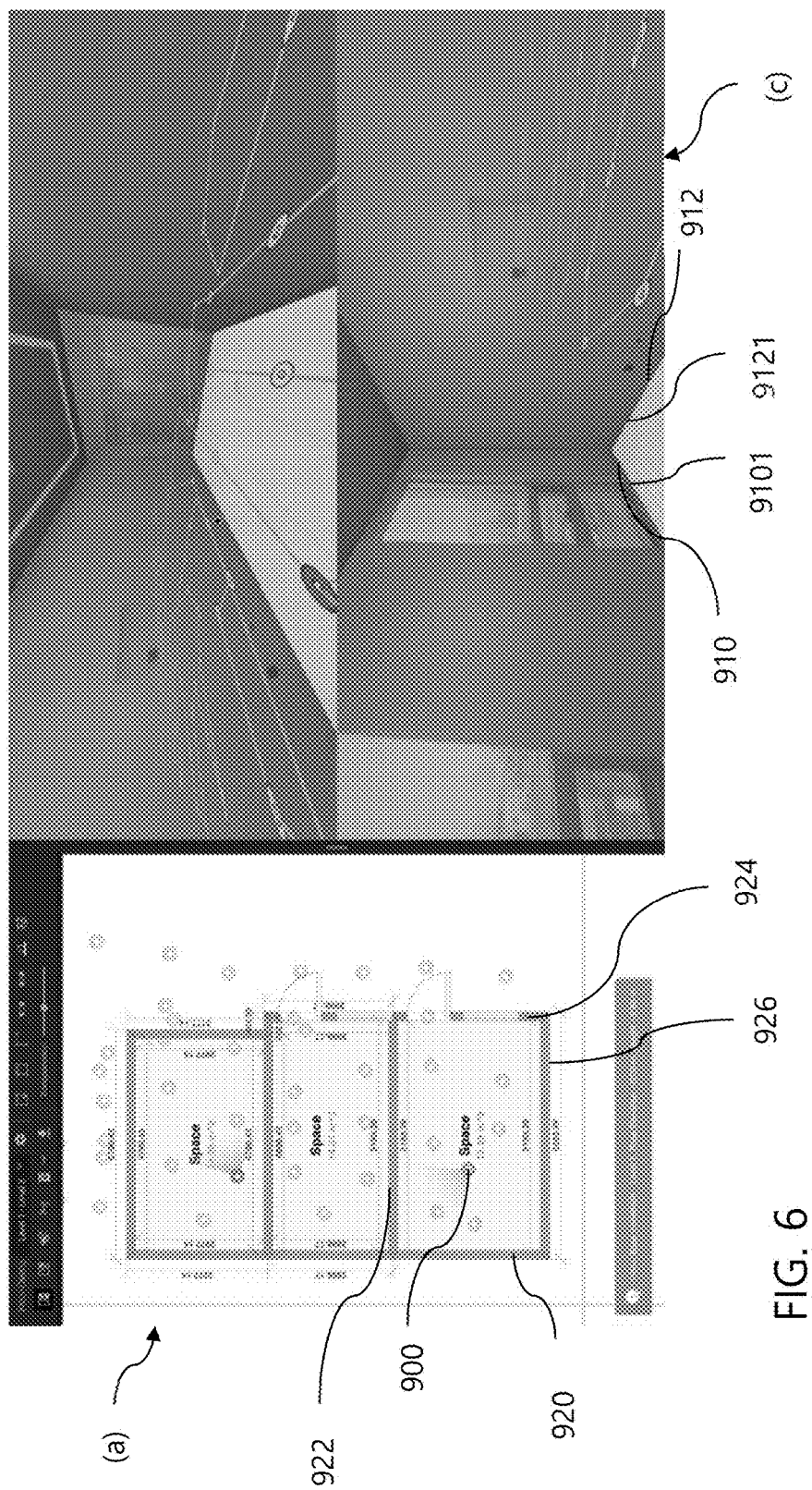

By repeating the above-described process, a three-dimensional model of a building structure may be generated as illustrated in FIG. 6 by sequentially constructing a plan view with respect to a plurality of three-dimensional models and checking the three-dimensional models on a photographic image on which the three-dimensional models are overlapped.

FIG. 3 shows a screen shot that includes a plan view pane (a) and an image pane (c). The plan view pane shows a camera location 900, and the image pane (c) shows a photographic image taken at the camera location 900. A plurality of camera locations 950 are illustrated over the photographic image in the image pane (c). The photographic image of in the image pane (c) of FIG. 3 shows bottom edge lines 910 and 912 that are further discussed below.

FIG. 4 shows another screen shot. The plan view pane (a) shows walls 920 and 922 that a user added. In the image pane (c) of FIG. 4, computer-generated lines 9101 and 9121 are shown and laid over the photographic image taken at the camera location 900. In embodiments, the computer-generated line 9101 is created by processing data of walls 920 and the computer-generated line 9201 is created by processing data of walls 922. As shown in the image pane (c) of FIG. 4, there is a gap 9103 between the edge line 910 and the computer-generated edge line 9101. There is another gap 9123 between the edge line 912 and the computer-generated edge line 9121. In embodiments, the gaps represent errors that may be resulted from various causes, for example, errors discussed in paragraph 00102 above.

In embodiments, the gaps can be corrected moving the walls 920 and 922 shown in FIGS. 5 and 6. FIG. 5 shows a further screen shot. The plan view pane (a) shows that the wall 922 is moved from the original location of the wall 922 shown in FIG. 4 to a new location. In embodiments, with an input device, the user moves the wall 922 to the new location until the computer-generated edge line 9121 substantially overlaps the edge line 912 of the photographic image as shown in the image pane (c) of FIG. 5.

Further, in a further another screenshot shown in FIG. 6, the plan view pane (a) shows the wall 920 moved from an original location shown in FIG. 4 to a new location. In embodiments, with an input device, the user moves the wall 920 to the new location until the computer-generated edge line 9101 substantially overlaps the edge line 910 of the photo image as shown in the image pane (c) of FIG. 6.

As described above, according to the present disclosure, time and effort may be significantly reduced when conducting tasks such as reverse architectural modeling or three-dimensional modeling, and as a result, productivity may be increased.

Also, according to the present disclosure, a plurality of photographs may be taken to obtain high-density point cloud data to omit large-scale calculation based on the point cloud data and also enable easy and convenient reverse modeling of a building structure at low costs. In addition, according to the present disclosure, reverse modeling data with reliable accuracy may be quickly obtained compared to other method of the related art.

Meanwhile, three-dimensional model data of a building structure according to the apparatus and method of three-dimensional reverse modeling of a building structure by using photographic images as described above is primarily calculated in the form of relative locations, but may be converted into absolute locations by applying a scale by using a simple method. A scale that is convertible into absolute locations may be received and applied, or absolute values of particular dimensions marked on a photographic image may be received and applied. According to circumstances, a photographic image of a building structure may be captured while marks indicating absolute distances are marked on the building structure, and a scale may be reflected by calculating a relative distance between the marks marked on the photographic image.

While the present disclosure has been described with reference to preferred embodiments, the scope of the present disclosure is not limited to the above described and illustrated structures.

For example, while it is described above that the reference point module 3600 receives the reference point M as an appoint reference point and locations thereof are calculated by the reference point module 3600 and marked on a plan view to be used. However, an apparatus and method of three-dimensional reverse modeling of a building structure by using photographic images, in which the reference point module 3600 is not used, may also be implemented.

In addition, while the use of photographic images captured using a camera has been described above according to the present disclosure, photographic images may be acquired not only by using a typical digital camera. Photographic images captured using a three-dimensional scanner may also be used for implementation of the present disclosure. Like digital cameras, a three-dimensional scanner acquires a photographic image of a photographing subject, and acquires shape information of a three-dimensional object by measuring depths of points of interest in each pixel of photographic images. According to three-dimensional information measured using a three-dimensional scanner, shapes are crushed at edge portions where surfaces meet, and thus, to obtain three-dimensional modeling information may be costly and take effort, and a result of calculation thereof may not be accurate. Here, by applying the present disclosure to photographic image information provided using a three-dimensional scanner, reverse modeling information of a building structure may be obtained easily and conveniently. That is, embodiments of the present disclosure may be used as a supplement or an alternative to a result of a three-dimensional scanner to obtain modeling information of a building structure.

In addition, while the example is described above, in which a two-dimensional drawing of a plane parallel to a floor surface of a building is constructed and used to generate three-dimensional modeling information, according to circumstances, the present disclosure may be implemented such that a two-dimensional drawing is constructed with respect to planes at various angles including a plane perpendicular to a floor surface of a building and three-dimensional modeling information is generated using the two-dimensional drawing.

According to the apparatus and method of three-dimensional reverse modeling of a building structure by using photographic images, according to the present disclosure, three-dimensional modeling data of a building structure may be reversely modeled by using photographic images of the building structure captured using a camera, at low costs and quickly and easily, thereby remarkably increasing the productivity of the manufacture of BIM.

Hereinafter, other embodiments of the present disclosures are discussed in detail below with reference to the attached drawings.

While absolute depths of the surroundings may be measured using equipment such as a three-dimensional scanner, it is difficult to use the equipment due to the high price of the equipment. In addition, even when using a three-dimensional scanner, it is difficult to obtain a reliable level of three-dimensional locations of all points of a space due to limitations in a resolution of the equipment or space restraints.

If three-dimensional locations of an arbitrary point in a space could be obtained within an allowable error range by using photographic images captured using a camera and without expensive equipment such as a three-dimensional scanner, time and effort required for measurement of the space may be saved, and productivity may be significantly improved. For example, if a distance between two points can be calculated just by selecting two points required to be measured, from photographic images that are captured in advance, without visiting the site every time to survey required dimensions, then productivity of architectural operations may be remarkably raised.

In addition, if measurement of the above-described type is possible, it may be possible to efficiently verify errors in the dimensions during a construction process of a building or survey a building in order to inspect safety of the building.

Figure 9:
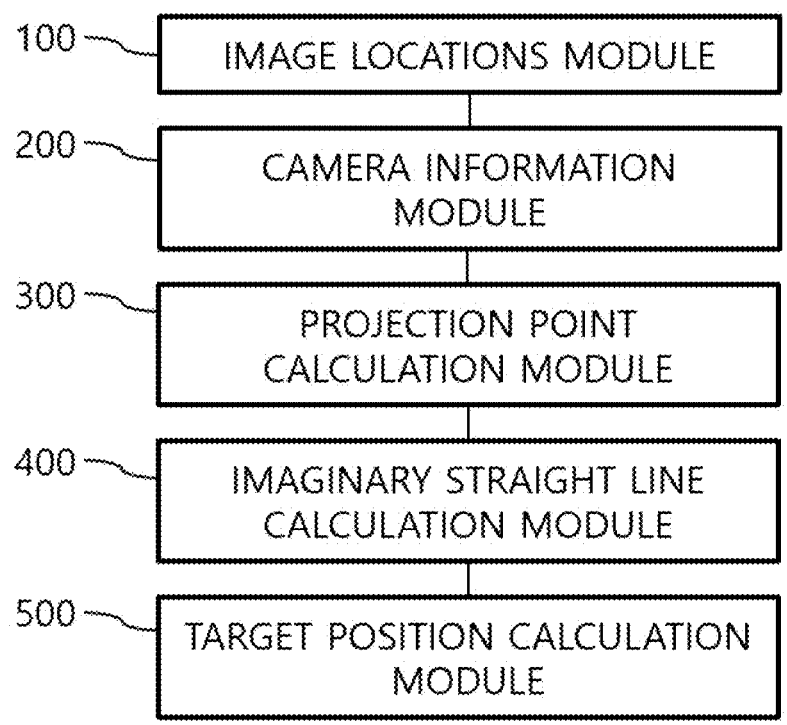
FIG. 9 is a block diagram of a three-dimensional locations calculating apparatus using photographic images, according to an embodiment of the present disclosure.
Figure 11:
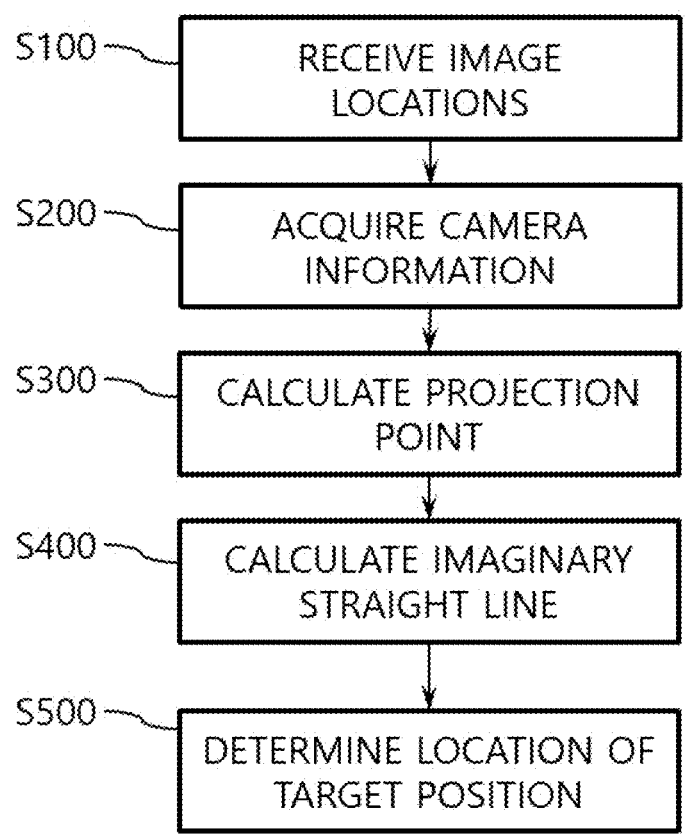
FIG. 11 is a flowchart of a three-dimensional locations calculation method, by using photographic images, according to an embodiment of the present disclosure.

FIG. 9 is a block diagram of a three-dimensional locations calculating apparatus using photographic images, according to an embodiment of the present disclosure. FIG. 11 is a flowchart of a three-dimensional locations calculation method, by using photographic images, according to an embodiment of the present disclosure.

The three-dimensional locations calculating apparatus using photographic images, and the three-dimensional location calculation method by using photographic images, according to the present disclosure, are directed to calculate three-dimensional locations of points marked on a plurality of photographic images captured using a camera, by using the photographic images. By calculating three-dimensional locations of target positions commonly marked on a plurality of photographic images, according to the present disclosure, the calculation may be used for various purposes, for example, in measuring a distance between points marked on photographic images by using just the photographic images.

Referring to FIG. 9, the three-dimensional locations calculating apparatus 1000 using photographic images, according to the present embodiment, includes an image locations module 100, a camera information module 200, a projection point calculation module 300, an imaginary straight line calculation module 400, and a target position calculation module 500.

The image locations module 100 receives, as image locations, 2 dimensional locations of a target position on photographical photographic images, wherein three-dimensional locations of the target positions are to be calculated and the target position is marked on the respective photographic images (step (aa); S100). For example, the image locations module 100 receives image locations of a target position in the form of 2 dimensional locations. Various input devices may be used to receive image locations. For example, the image locations module 100 that receives image locations of a target position through a user's clicking the target position on a photographic image displayed on a display device of a computer by using a mouse may be used. When a user inputs locations of a same target position marked on two or more photographic images by using this method, the image locations module 100 receives locations on the respective photographic images, at which the target position is marked, and stores the locations.

The camera information module 200 acquires a position and direction of a camera that has captured the photographic images on which the target position is marked, as camera information (step (bb); step S200). A position of a camera or a location of an optical center and direction of a camera or a direction of an optical axis when the camera is capturing a photographic image will be defined and described as camera information below. A camera position of camera information is identical to locations of a projection center point (view point) of a camera.

The camera information module 200 may acquire camera information by using various methods.

First, the camera information module 200 may acquire camera information by using a computer vision structure from motion (SfM) method. The computer vision SfM method is a technique of calculating structural information including three-dimensional locations and a direction of a camera when the camera is taking pictures by analyzing just photographic images of the pictures.

Second, when capturing a photographic image by using a camera, camera information may be calculated based on measurement values or variation of measurement values according to time obtained using various types of sensors such as an inertial measurement unit (IMU), an acceleration sensor, a geomagnetic sensor, an angular displacement sensor or the like or in. For example, a variation of a displacement may be calculated by integrating an acceleration twice, and thus, camera information may be calculated accurately or quickly by using values calculated as described above.

Camera information may also be acquired using the computer vision SfM method and measurement values of various sensors in combination.

According to circumstances, an additional apparatus may store a position and direction of a camera, measured each time when a photographic image is captured, and the camera information module 200 may use camera information stored as above.

The projection point calculation module 300 calculates three-dimensional locations of a position where a target position is marked on a projection surface of a camera placed in a three-dimensional space based on the camera information acquired using the camera information module 200 (step (cc); S300). A target position marked on a projection surface of a camera will be defined and described as a projection point below. A projection surface of a camera corresponds to a film or an image sensor of a camera. In digital cameras, for example, a complementary metal-oxide semiconductor (CMOS) image sensor or a charge-coupled device (CCD) image sensor corresponds to a projection surface. A distance between an optical center and a projection surface of a camera and a 2D size of the projection surface correspond to camera intrinsic parameters, and thus, values of the distance between the optical center and the projection surface and the size of the projection surface may be acquired from information about the camera. By using the camera information, the 2D size of the projection surface and the distance between the optical center and the projection surface, and 2D location of a target position on the photographic image, the projection point calculation module 300 may calculate three-dimensional locations of the projection point.

FIGS. 5 and 6 illustrate projection points P1, P2, and P3 and projection surfaces S1, S2, and S3 calculated by using a target position commonly marked on three photographic images and camera information.

While the projection surfaces S1, S2, and S3 having a rectangular shape are illustrated as an example in FIGS. 5 and 6, projection surfaces may also be curved surfaces according to circumstances. In addition, as there may be distortion between an actual subject and a photographic image projected onto a projection surface, an error may occur when mapping a target position to the projection points P1, P2, and P3 of the projection surfaces S1, S2, and S3. The projection point calculation module 300 may also calculate locations of the projection points P1, P2, and P3 by reducing an error in consideration of the above distortion.

The imaginary straight line calculation module 400 calculates imaginary straight lines L1, L2, and L3 respectively connecting the projection points P1, P2, and P3 to a camera position of camera information (projection center points (view points, 3D locations of optical center points) C1, C2, and C3) (step (dd); S400). The camera information module 200 has acquired the projection center points C1, C2, and C3 of the camera, and the projection point calculation module 300 has calculated the projection points P1, P2, and P3. Then the imaginary straight line calculation module 400 may respectively calculate the imaginary straight lines L1, L2, and L3 connecting two points in a three-dimensional space (the camera projection center points C1, C2, and C3 and the projection points P1, P2, and P3).

Referring to FIG. 7, the imaginary straight lines L1, L2, and L3 theoretically meet with each other at a target position M0. For example, the target position M0 selected from photographic images captured at different positions correspond to a same point in the three-dimensional space, and thus, all of the straight lines connected from each position of the camera (the projection center points C1, C2, and C3) to the projection points P1, P2, and P3 pass by the same target position or target position, the point M0, as illustrated in FIG. 7.

According to this principle, the target position calculation module 500 determines locations of a point that is in a region where a distance between the point and the imaginary straight lines L1, L2, and L3 is the shortest, as three-dimensional locations of the target position M0 (step (ee); S500). As described above, all the imaginary straight lines L1, L2, and L3 meet with each other at the target position M0 theoretically. A point where the imaginary straight lines L1, L2, and L3 cross with each other is the target position M0 as illustrated in FIG. 7. In this case, the target position calculation module 500 determines locations of the point at which the imaginary straight lines L1, L2, and L3 cross as locations of the target position M0.

When calculating the imaginary straight lines L1, L2, and L3 by using the imaginary straight line calculation module 400 by using photographic images actually captured using a camera, the imaginary straight lines L1, L2, and L3 may not cross as illustrated in FIG. 8. The three-dimensional locations calculating apparatus 1000 using photographic images, according to the present embodiment, is directed to indirectly estimate three-dimensional locations by using two-dimensional photographic images, and thus various errors may occur during estimation of three-dimensional locations. For example, an error may occur while receiving image locations via the image locations module 100. In some instances, when receiving image locations of a target position marked on respective photographic images, photographic image location values of the target position may have an error. In particular, the image locations module 100 may receive image locations having an error when a user clicks a target position on each photographic image by using an inputting device such as mouse. Also when the camera information module 200 acquires camera information, errors may be generated to some extent as the camera information module 200 calculates camera information by using a computer SfM method or by using measurement values obtained from various sensors.

Due to the errors occurring due to various factors as described above, the imaginary straight lines L1, L2, and L3 calculated using the imaginary straight line calculation module 400 may not intersect with each other as illustrated in FIG. 8.

In this case, the target position calculation module 500 determines three-dimensional locations of a target position by using various mathematical or statistical methods.

For example, as illustrated in FIG. 8, two lines among the imaginary straight lines L1, L2, and L3 may be selected and segments that interconnect the imaginary straight lines L1, L2, and L3 by a shortest distance may be determined. Points M12, M13, and M23 bisecting segments as described above may be points that are at a shortest distance from the imaginary straight lines L1, L2, and L3, to which the points M12, M13, and M23 respectively correspond.

The target position calculation module 500 may determine three-dimensional locations of a target position by applying statistical standards to locations of the bisection points M12, M13, and M23 of the shortest segment as described above. For example, one of statistical representative values such as an average, an intermediate value, or a median may be determined as three-dimensional locations of a target position. Also, a method of determining locations of a target position by excluding an outlier that exceeds allowable limits of error, based on normal distribution and standard deviation, may be used.

In addition, the target position calculation module 500 may use a method of determining three-dimensional locations of a target position by applying various standards to points which are in a particular area in a three-dimensional space and at a shortest distance from the imaginary straight lines L1, L2, and L3.

According to the three-dimensional locations calculating apparatus 1000 using photographic images, and the three-dimensional locations calculation method, by using photographic images, as described above, by calculating locations of two target positions, a distance between the target positions may also be easily calculated.

Figure 10:
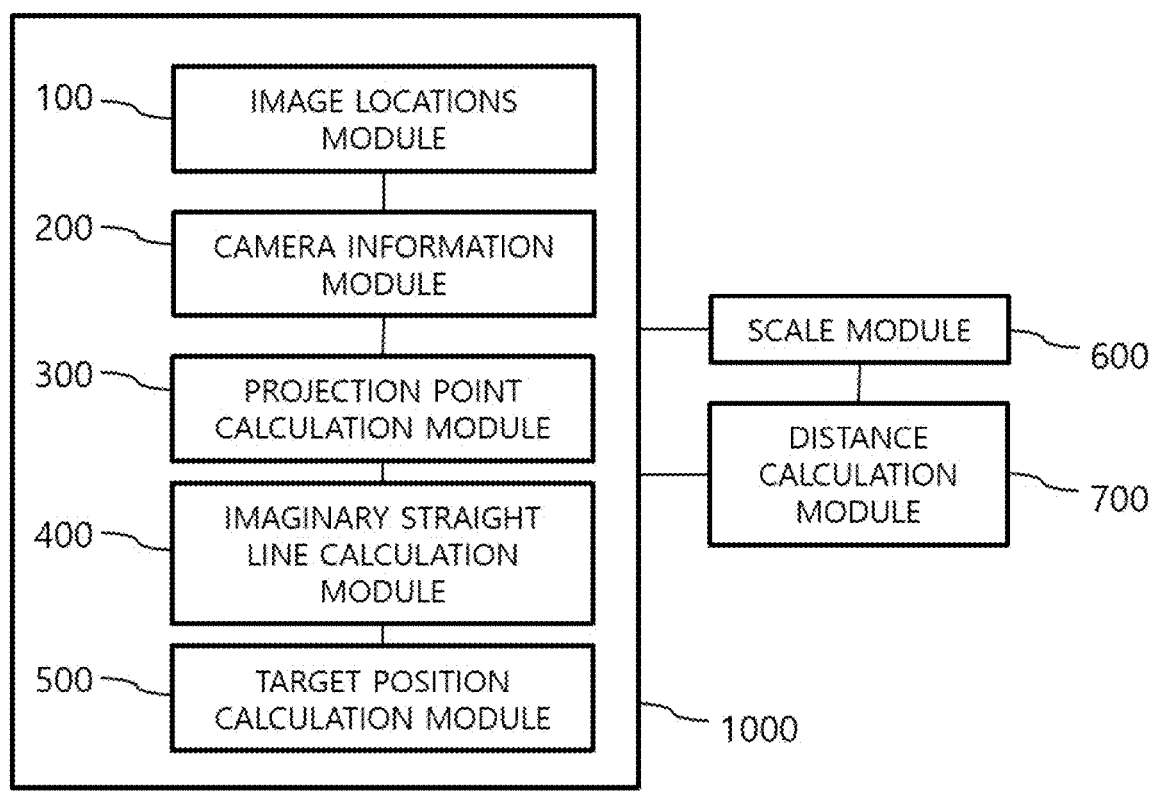
FIG. 10 is a block diagram of a three-dimensional distance measuring apparatus using photographic images, according to an embodiment of the present disclosure.
Figure 12:
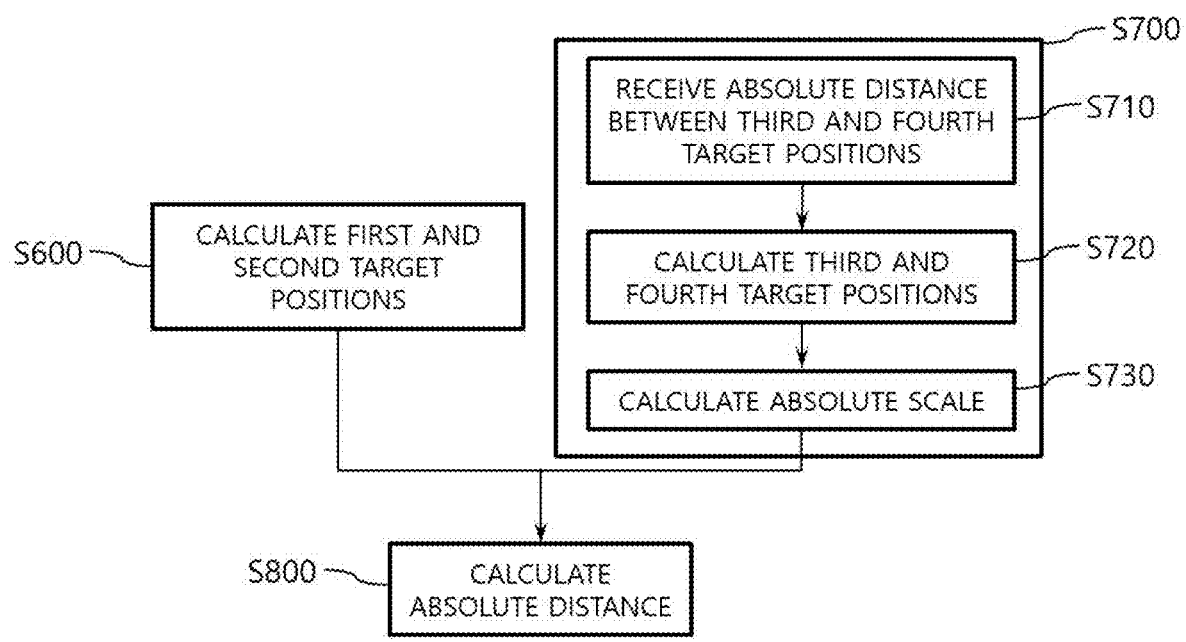
FIG. 12 is a flowchart of a three-dimensional distance measurement method, by using photographic images, according to an embodiment of the present disclosure.
Figure 13:
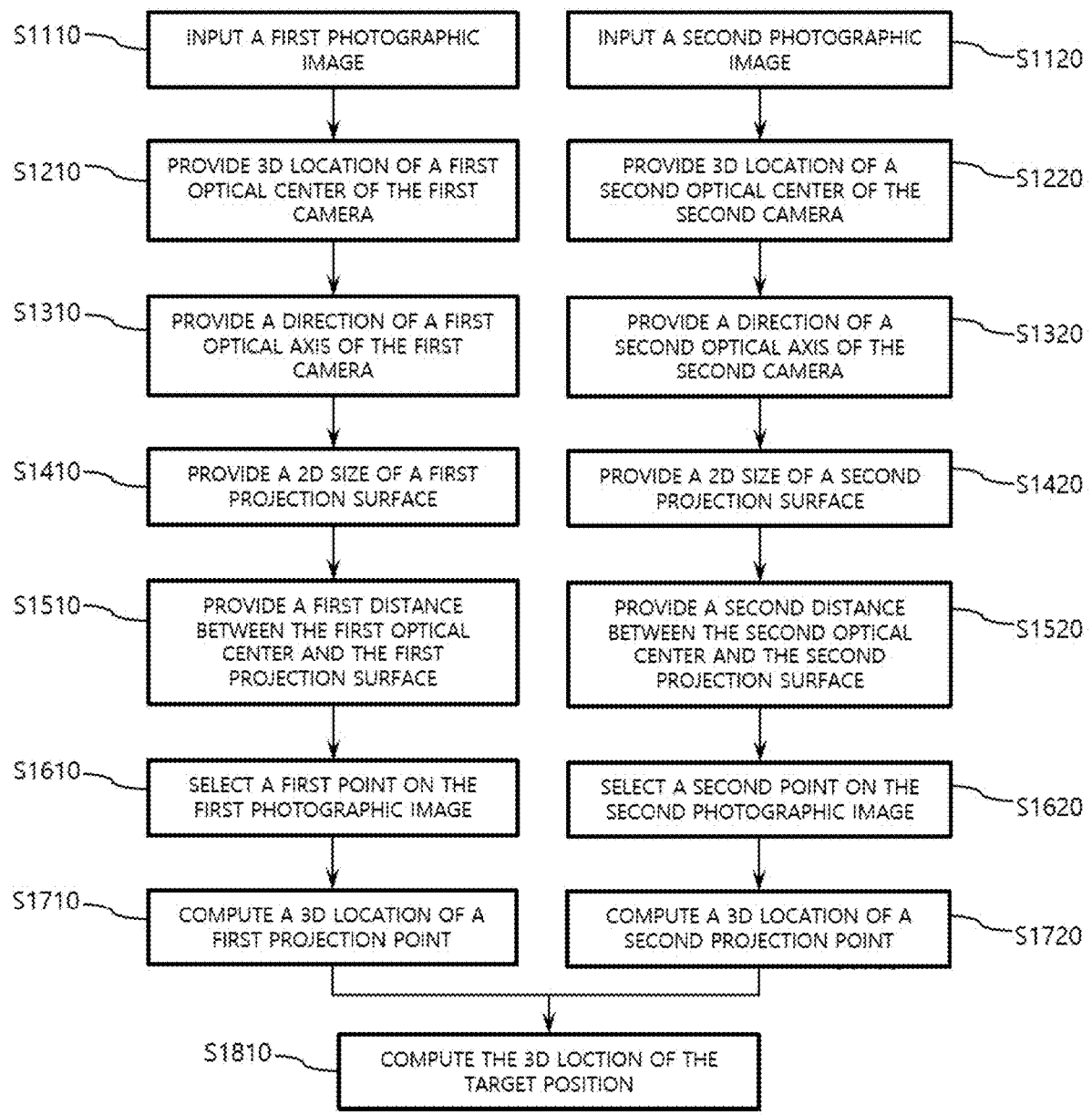
FIG. 13 is a flowchart of a method of processing two or more different photographs according to an embodiment of the present disclosure.
Figure 14:
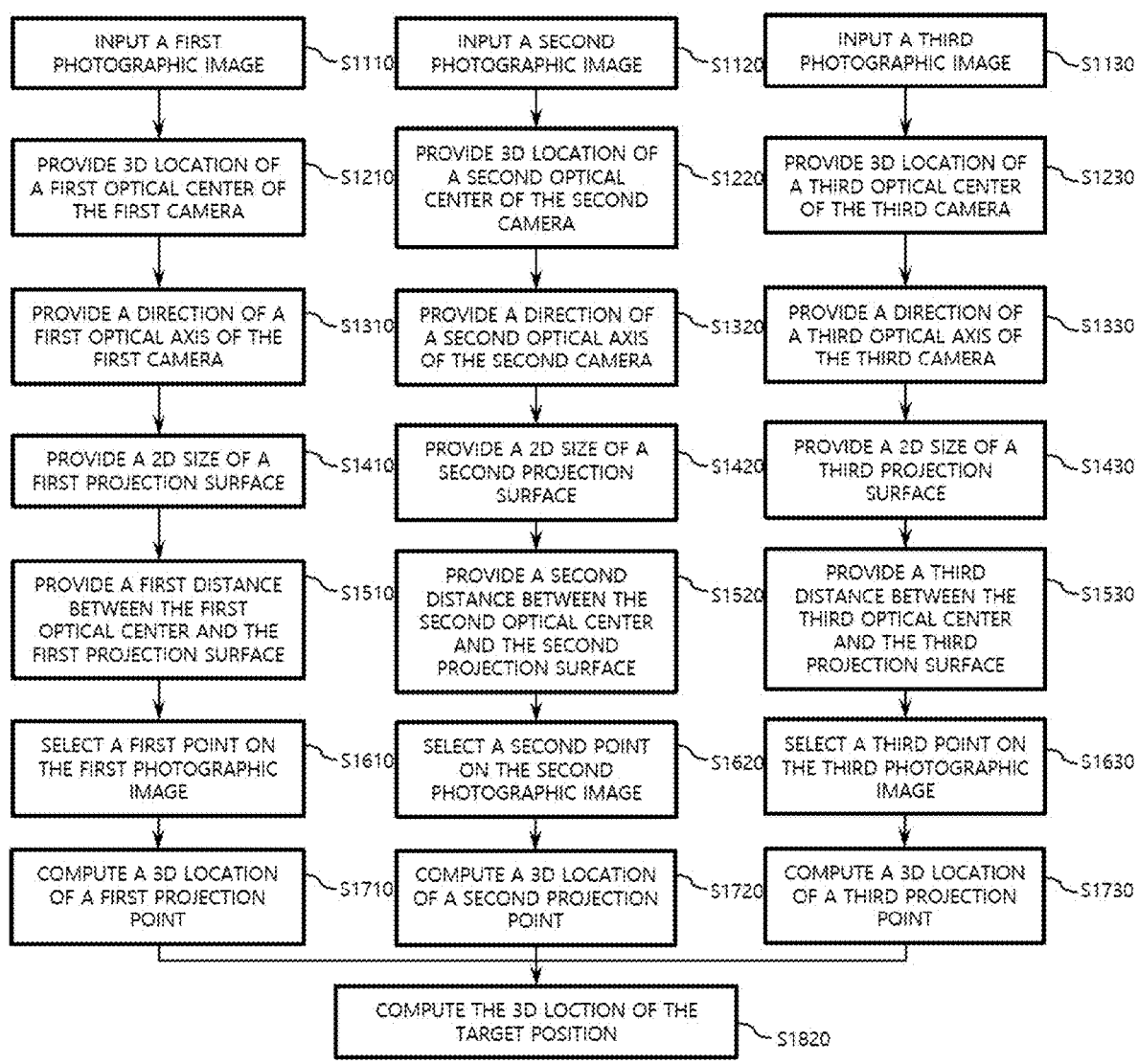
FIG. 14 is a flowchart of a method of processing two or more different photographs according to another embodiment of the present disclosure.

FIG. 10 is a block diagram of a three-dimensional distance measuring apparatus using photographic images, according to an embodiment of the present disclosure. FIG. 12 is a flowchart of a three-dimensional distance measurement method, by using photographic images, according to an embodiment of the present disclosure.

Referring to FIG. 10, the three-dimensional distance measuring apparatus using photographic images, according to the present embodiment, may also include the image locations module 100, the camera information module 200, the projection point calculation module 300, the imaginary straight line calculation module 400, and the target position calculation module 500 of the three-dimensional locations calculating apparatus 1000 using photographic images, described with reference to FIG. 9, and may further include a scale module 600 and a distance calculation module 700.

The scale module 600 acquires an absolute scale whereby a relative distance between two points in a three-dimensional space may be converted into an absolute distance (step (gg); S700). An absolute scale is a ratio of a relative distance to an absolute distance. An absolute distance between two target positions may be calculated by multiplying a relative distance between the two target positions by an absolute scale.

Various methods may be used to acquire an absolute scale by using the scale module 600.

First, the scale module 600 may receive an absolute scale input by a user by using an inputting device, and use the absolute scale.

Second, a method of calculating a distance between two points (a third target position and a fourth target position), an absolute distance of which is known. First, the scale module 600 receives an absolute distance between the third target position and the fourth target position (step (gg-1); S710). Three-dimensional locations of the third target position and the fourth target position, the absolute distance between which is known, are respectively calculated using the above-described method (step (gg-2); S720). By calculating a relative distance between the third target position and the fourth target position based on the three-dimensional locations of the third target position and the fourth target position calculated by the scale module 600 and using the already known absolute distance, an absolute scale may be calculated (step (gg-3); S730).

Third, similarly to the second method above, standard marks may be used to calculate an absolute scale. Standard marks arranged at intervals of an absolute unit distance such as 1 meter or 10 centimeters are placed in a photographing site. When capturing a photographic image of a space to be measured, the standard marks marked in the photographing site are also photographed. A relative distance is calculated by designating the standard marks as a third target position and a fourth target position in captured photographic images. Here, by capturing photographic images by marking the standard marks in the photographing site in a form that is automatically recognized by the scale module 600, the scale module 600 may calculate an absolute scale by automatically recognizing the standard marks from the photographic images.

When the absolute scale is provided using the scale module 600 as described above, an absolute distance between any two arbitrary target positions may be calculated. By respectively performing steps (aa) through (ee) (S100 through S500) by using the image locations module 100, the camera information module 200, the projection point calculation module 300, the imaginary straight line calculation module 400, and the target position calculation module 500 in the above-described method, three-dimensional locations of a first target position and a second target position are respectively calculated (step (ff); S600). The distance calculation module 700 calculates an absolute distance between the first target position and the second target position by using the absolute scale acquired using the scale module 600 and the three-dimensional locations of the first target position and the second target position (step (hh); S800).

According to the method as described above, a distance between two points in a space may be measured at remarkably low costs within the appropriate limits of error. For example, instead of measuring a distance between target positions by using a measurement device such as a tape measure by visiting the site every time, a distance between arbitrary points may be measured just by using previously captured pictures. According to embodiments of the present disclosure, each time when measurement is required, there is no need to visit the site again, and distance measurement may be performed using just previously captured pictures. In addition, since just capturing photographic images simply allows measurement of a distance between arbitrary points, distances between two points that are additionally needed to be measured during an ongoing project may be measured easily without revisiting the site.

As described above, according to the present disclosure, time and efforts may be significantly reduced when conducting tasks such as architectural design or remodeling and productivity may be increased.

In addition, the present disclosure may also be used in verifying an error of a construction work process. By storing repeatedly captured photographic images of a construction site in a construction work process, changes in dimensions of the construction site according to the construction process may be detected according to the present disclosure. In the event a problem occurs after completion of the construction, whether there was an error in the dimensions in the process of construction may be easily inspected just by using the captured photographic images of the construction site.

While the present disclosure has been described with reference to embodiments, the scope of the present disclosure is not limited to the above described and illustrated structures.

For example, the use of photographic images captured using a camera has been described above, according to the present disclosure, photographic images may be acquired not only by using a typical digital camera. Photographic images captured using a three-dimensional scanner may also be used for implementation of the present disclosure. Like digital cameras, a three-dimensional scanner acquires a photographic image of a photographing subject, and acquires shape information of a three-dimensional object by measuring depths of points of interest in each pixel of photographic images. According to three-dimensional information measured using a three-dimensional scanner, shapes are crushed at edge portions where surfaces meet, and thus, measuring a distance may be difficult or the measurement may not be accurate. Here, by applying the present disclosure to photographic image information provided using the three-dimensional scanner, locations of a target position or a distance between target positions may be calculated effectively. Embodiments of the present disclosure may be used as a supplement or an alternative to a result of a three-dimensional scanner to further improve distance measurement performance.

According to the three-dimensional locations calculating apparatus using photographic images and the three-dimensional locations calculation method, by using photographic images, according to the present disclosure, three-dimensional locations of arbitrary points marked on photographic images may be easily calculated by using photographic images captured by a camera.

In addition, according to the three-dimensional distance measuring apparatus using photographic images and the three-dimensional distance measurement method, by using photographic images, according to the present disclosure, a distance between two arbitrary points marked on photographic images may be easily measured by using photographic images captured by a camera.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of producing a 3D computer model of a room based on photographs, the method comprising:
providing, to a computerized system, a plurality of sets of data associated with a first room, comprising a first set of data and a second set of data,
wherein the first set of data comprises 1) a first photographic image of the first room taken by a first camera inside the first room or first data representing the first photographic image, 2) a three-dimensional (3D) location of a first optical center of the first camera at the time the first photographic image was taken, and 3) a direction of a first optical axis of the first camera at the time the first photographic image was taken;
wherein the second set of data comprises 1) a second photographic image of the first room taken by a second camera inside the first room or second data representing the second photographic image, 2) a 3D location of a second optical center of the second camera at the time the second photographic image was taken, and 3) a direction of a second optical axis of the second camera at the time the second photographic image was taken, wherein the second camera is the first camera or another camera;
providing, to the computerized system, a 3D location of at least one feature of the first room;
generating, using the computerized system, a two-dimensional (2D) drawing of the first room using the 3D location of the at least one feature of the first room;
generating, using the computerized system, a 3D computer model of the first room using the 2D drawing;
configuring, using the computerized system, a first view of the 3D computer model as if the first view is taken, in a 3D computer modeled space of the first room according to the 3D computer model, from the first optical center in the direction of the first optical axis as the first photographic image was taken by the first camera so that the first view and the first photographic image comprise common features,
wherein at least one of the common features of the first view and the first photographic image is not exactly in the same size even if the first view is configured as if it was taken as the first photographic image was taken by the first camera;
wherein the common features of the first view and the first photographic image comprise a first surface of the first room and a first surface edge defined by the first surface and another surface of the first room, wherein the first surface is selected from the group consisting of a wall, a floor and a ceiling of the first room, wherein the other surface is a discrete surface that the first surface neighbors without an intervening surface therebetween;
overlaying, using the computerized system, the first view and the first photographic image on at least one display screen associated with the computerized system such that the first surface of the first view and the first surface of the first photographic image overlap with each other while the first surface edge of the first view is off from the first surface edge of the first photographic image with a first gap therebetween;
while the first view and the first photographic image overlay on the at least one display screen, providing, to the computerized system, a user input to displace the first view relative to the first photographic image in a first direction to make the first gap zero or smaller than prior to displacing the first view,
wherein displacing the first view relative to the first photographic image in the first direction causes updating the 3D computer model of the first room such that 3D locations defining the first surface edge change in the 3D computer model in accordance with a vector representing the displacement of the first view relative to the first photographic image;
configuring, using the computerized system, a second view of the 3D computer model as if the second view is taken, in a 3D computer modeled space of the first room according to the 3D computer model, from the second optical center in the direction of the second optical axis as the second photographic image was taken by the second camera so that the second view and the second photographic image comprise common features, wherein at least one of the common features of the second view and the second photographic image is not exactly in the same size even if the second view is configured as if it was taken as the second photographic image was taken by the second camera, wherein the common features of the second view and the second photographic image comprise a second surface of the first room and a second surface edge defined by the second surface and another surface of the first room, wherein the second surface is selected from the group consisting of a wall, a floor and a ceiling of the first room, wherein the other surface is a discrete surface that the second surface neighbors without an intervening surface therebetween;

overlaying, using the computerized system, the second view and the second photographic image on at least one display screen associated with the computerized system such that the second surface of the second view and the second surface of the second photographic image overlap with each other while the second surface edge of the second view is off from the second surface edge of the second photographic image with a second gap therebetween; and while the second view and the second photographic image overlay on the at least one display screen, providing, to the computerized system, a user input to displace the second view relative to the second photographic image in a second direction to make the second gap zero or smaller than prior to displacing the second view, wherein displacing the second view relative to the second photographic image in the second direction causes updating the 3D computer model of the first room such that 3D locations defining the second surface edge change in the 3D computer model in accordance with a vector representing the displacement of the second view relative to the second photographic image; and wherein the 3D location defines a location relative to a reference point in a 3D space.

2. The method of claim 1, wherein the first surface edge is one of:
a first wall-floor edge defined between the first surface being a wall of the first room and a floor of the first room that the wall abuts,
a first wall-ceiling edge defined between the first surface being a wall of the first room and a ceiling of the first room that the first surface abuts,
a first wall-wall edge defined between the first surface being a wall of the first room and another wall of the first room that the wall abuts,
a first floor-wall edge defined between the first surface being a floor of the first room and a wall of the first room that the floor abuts, and
a first ceiling-wall edge defined between the first surface being a ceiling of the first room and a wall of the first room that the ceiling abuts.

3. The method of claim 1, wherein the first surface edge is and hereinafter referred to as a first wall-floor edge defined between the first surface being a wall of the first room and a floor of the first room that the wall abuts, wherein the first gap is hereinafter referred to a first wall-floor edge gap, wherein the common features further comprises a first wall-ceiling edge defined by the wall and a ceiling of the first room that the wall abuts, wherein, when overlaying the first view and first photographic image, the first wall-floor edge of the first view is off from the first wall-floor edge of the first photographic image with the first wall-floor edge gap therebetween and the first wall-ceiling edge of the first view is off from the first wall-ceiling edge of the first photographic image with a first wall-ceiling edge gap therebetween, wherein the method further comprises:
while the first view and the first photographic image overlay on the at least one display screen, providing, to the computerized system, a user input to further displace the first view relative to the first photographic image in a direction other than the first direction to make the first wall-ceiling edge gap zero or smaller than prior to displacing the first view, wherein further displacing the first view relative to the first photographic image in the direction other than the first direction causes further updating the 3D computer model of the first room such that 3D locations defining the first wall-ceiling edge change in the 3D computer model in accordance with a vector representing the further displacement of the first view relative to the first photographic image.

4. The method of claim 1, wherein the first surface edge is and hereinafter referred to as a first wall-wall edge defined between the first surface being a wall of the first room and another wall of the first room that the first surface abuts, wherein the first gap is hereinafter referred to a first wall-wall edge gap, wherein the common features further comprises a first wall-ceiling edge defined by the wall and a ceiling of the first room that the wall abuts, wherein, when overlaying the first view and first photographic image, the first wall-wall edge of the first view is off from the first wall-wall edge of the first photographic image with the first wall-wall edge gap therebetween and the first wall-ceiling edge of the first view is off from the first wall-ceiling edge of the first photographic image with a first wall-ceiling edge gap therebetween, wherein the method further comprises:
while the first view and the first photographic image overlay on the at least one display screen, providing, to the computerized system, a user input to further displace the first view relative to the first photographic image in a direction other than the first direction to make the first wall-ceiling edge gap zero or smaller than prior to displacing the first view, wherein further displacing the first view relative to the first photographic image in the direction other than the first direction causes further updating the 3D computer model of the first room such that 3D locations defining the first wall-ceiling edge change in the 3D computer model in accordance with a vector representing the further displacement of the first view relative to the first photographic image.

5. The method of claim 1, wherein the first surface edge is and hereinafter referred to as a first wall-ceiling edge defined between the first surface being a wall of the first room and a ceiling of the first room that the wall abuts, wherein the first gap is hereinafter referred to a first wall-ceiling edge gap, wherein the common features further comprises a first wall-floor edge defined by the wall and a floor of the first room that the wall abuts, wherein, when overlaying the first view and first photographic image, the first wall-ceiling edge of the first view is off from the first wall-ceiling edge of the first photographic image with the first wall-ceiling edge gap therebetween and the first wall-floor edge of the first view is off from the first wall-floor edge of the first photographic image with a first wall-floor edge gap therebetween, wherein the method further comprises:
while the first view and the first photographic image overlay on the at least one display screen, providing, to the computerized system, a user input to further displace the first view relative to the first photographic image in a direction other than the first direction to make the first wall-floor edge gap zero or smaller than prior to displacing the first view, wherein further displacing the first view relative to the first photographic image in the direction other than the first direction causes further updating the 3D computer model of the first room such that 3D locations defining the first wall-floor edge change in the 3D computer model in accordance with a vector representing the further displacement of the first view relative to the first photographic image.

6. The method of claim 1, wherein the 2D drawing comprises a 2D plan view drawing of the first room.

7. The method of claim 6, wherein generating the 2D drawing of the first room comprises:
displaying, on a plan view configuration, the 3D location of the first optical center of the first camera and the 3D location of the second optical center of the second camera;
displaying the 3D location of the at least one feature of the first room on the plan view configuration; and
generating, on the plan view configuration, at least one line representing at least one wall of the first room using the 3D location of the at least one feature of the first room.

8. The method of claim 7, wherein the at least one feature of the first room comprises one of a plurality of corners of a first wall, wherein the vector representing the displacement of the first view comprises a size of the displacement and the first direction of the displacement.

9. The method of claim 7, wherein the at least one feature of the first room comprises a plurality of features of the first room, which comprises one of a plurality of corners of the first surface and one of a plurality of corners of the second surface.

10. The method of claim 9, wherein generating the at least one line representing at least one wall comprises connecting with a line between the one of a plurality of corners of the first surface and the one of a plurality of corners of the second surface.

11. The method of claim 7, wherein the 3D location of the at least one feature of the first room is also used in generating the 3D computer model of the first room.

12. The method of claim 1, wherein, when the 3D locations defining the first surface edge change in the 3D computer model, 3D locations defining another edge of the first surface also change in the 3D computer model.

13. The method of claim 1, wherein the plurality of sets of data further comprises a third set of data, which comprises: 1) a third photographic image of a first room taken by a third camera inside the first room or third data representing the third photographic image, 2) a three-dimensional (3D) location of a third optical center of the third camera at the time the third photographic image was taken, and 3) a direction of a third optical axis of the third camera at the time the third photographic image was taken, wherein the third camera is the first camera, the second camera or another camera, wherein providing 3D locations of a plurality of features of the first room comprises determining, by the computerized system, a 3D location of a first feature that appears on both the first photographic image and the third photographic image.

14. The method of claim 13, wherein determining the 3D location of the first feature comprises:
providing, to the computerized system, a 2D size of a first projection surface, on which an optical image is projected inside the first camera for capturing the optical image, or information leading to the 2D size of the first projection surface of the first camera;
providing, to the computerized system, a 2D size of a third projection surface, on which an optical image is projected inside the third camera for capturing the optical image, or information leading to the 2D size of the third projection surface of the third camera;
providing, to the computerized system, a first distance between the first optical center and the first projection surface along the first optical axis or information leading to the first distance of the first camera;
providing, to the computerized system, a third distance between the third optical center and the third projection surface along the third optical axis or information leading to the third distance of the third camera;
receiving a first selection of a first point representing the first feature of the first room on the first photographic image displayed on at least one display screen of the computerized system;
receiving a second selection of a second point representing the first feature of the first room on the third photographic image displayed on the at least one display screen of the computerized system; and
causing at least one processor of the computerized system to execute computer software stored in at least one memory of the computerized system to perform the following:
processing the first photographic image, the 2D size of the first projection surface, the direction of the first optical axis, and the first distance to compute a 3D location of a first projection point at which the first feature of the first room would have been projected on the first projection surface, or on an imaginary plane parallel to the first projection surface, at the time the first photographic image was taken by the first camera,
processing the third photographic image, the 2D size of the third projection surface, the direction of the third optical axis, and the third distance to compute a 3D location of a third projection point at which the first feature of the first room would have been projected on the third projection surface, or an imaginary plane parallel to the third projection surface, at the time the third photographic image was taken by the third camera, and
processing the 3D location of the first projection point, the 3D location of the first optical center, the 3D location of the third projection point, and the 3D location of the third optical center to compute a 3D location of the first feature of the first room as a first imaginary straight line passing the 3D location of the first projection point and the 3D location of the first optical center would also pass or pass by the first feature of the first room and further a second imaginary straight line passing the 3D location of the third projection point and the 3D location of the third optical center would also pass or pass by the first feature of the first room such that the first imaginary straight line and the second imaginary straight line cross or are close to each other at or near the first feature.

15. The method of claim 14, wherein the first photographic image and the third photographic image are two-dimensional images of the first room and taken from different locations of the first room such that some features of the first room are depicted in both of the first photographic image and the third photographic image.

16. The method of claim 14, wherein processing to compute the 3D location of the first projection point on the first projection surface comprises:
   processing the first photographic image to determine a 2D size of the first photographic image;
   processing the first photographic image to determine a 2D location of the first point on the first photographic image;
   subsequently, processing the 2D size of the first projection surface, the 2D size of the first photographic image, and the 2D location of the first point on the first photographic image to determine a 2D location of the first projection point on the first projection surface that corresponds to the first point on the first photographic image; and
   subsequently, processing the direction of the first optical axis, the 3D location of the first optical center, the first distance, and the 2D location of the first projection point on the first projection surface to determine the 3D location of the first projection point at which the first feature would have been projected on the first projection surface at the time the first photographic image was taken,
   wherein the 2D location defines a location relative to a reference point in a 2D plane.

17. The method of claim 16, wherein in determining the 2D location of the first projection point on the first projection surface, the 2D size of the first projection surface and the 2D size of the first photographic image are used to provide a ratio therebetween.

18. The method of claim 17, wherein determining the 2D location of the first projection point on the first projection surface further comprises mapping the first point on the first photographic image on the first projection surface in view of the ratio between the 2D size of the first projection surface and the 2D size of the first photographic image.

19. The method of claim 18, wherein the first point on the first photographic image is mapped on the first projection surface given that the first projection point on the first projection surface and the first point on the first photographic image are point symmetric to the first optical axis.

20. The method of claim 16, wherein in determining the 3D location of the first projection point, the direction of the first optical axis is used to determine an orientation of the first projection surface at the time the first photographic image was taken as the direction of the first optical axis is perpendicular to the first projection surface.

21. The method of claim 20, wherein in determining the 3D location of the first projection point, the 3D location of the first optical center and the first distance are used to provide a 3D location of the first projection surface in the 3D space, wherein the 2D location of the first projection point on the first projection surface and the 3D location of the first projection surface are processed to provide the 3D location of the first projection point in the 3D space.

22. The method of claim 16, wherein processing to compute the 3D location of the first projection point on the imaginary plane parallel to the first projection surface comprises:
   processing the first photographic image to determine a 2D size of the first photographic image;
   processing the first photographic image to determine a 2D location of the first point on the first photographic image;
   subsequently, processing the 2D size of the first projection surface, the 2D size of the first photographic image, and the 2D location of the first point on the first photographic image, the first distance, and an imaginary projection distance between the imaginary plane and the first optical center in the first optical axis to determine a 2D location of the first projection point on the imaginary plane parallel to the first projection surface that corresponds to the first point on the first photographic image; and
   subsequently, processing the direction of the first optical axis, the 3D location of the first optical center, the first distance, and the 2D location of the first projection point on the imaginary plane parallel to the first projection surface to determine the 3D location of the first projection point at which the first feature would have been projected on the imaginary plane parallel to the first projection surface at the time the first photographic image was taken,
   wherein the 2D location defines a location relative to a reference point in a 2D plane,
   wherein in determining the 2D location of the first projection point on the imaginary plane, the first distance and the imaginary projection distance are used to provide a first ratio therebetween, and the 2D size of the first projection surface and the first ratio are used to provide a 2D size of the imaginary plane,
   wherein the 2D size of the imaginary plane and the 2D size of the first photographic image are used to provide a second ratio therebetween,
   wherein determining the 2D location of the first projection point on the first projection surface further comprises mapping the first point on the first photographic image on the imaginary plane in view of the second ratio between the 2D size of the imaginary plane and the 2D size of the first photographic image,
   wherein the first point on the first photographic image is mapped on the imaginary plane given that, the first projection point on the imaginary plane and the first point on the first photographic image are point symmetric to the first optical axis.

23. The method of claim 16, wherein when the first imaginary straight line and the second imaginary straight line cross, the first feature is a point where the first imaginary straight line and the second imaginary straight line cross in the 3D space.

24. The method of claim 16, wherein when the first imaginary straight line and the second imaginary straight line do not cross, computing the 3D location of the first feature comprises:
   determining a shortest straight line interconnecting between the first imaginary straight line the second imaginary straight line; and
   determining the first feature in the 3D space using the shortest straight line.

25. A method of producing a 3D computer model of a building, the method comprises:
   producing the 3D computer model of the first room according to the method of claim 1; and
   producing a 3D computer model of a second room adjacent to the first room in the building.

26. The method of claim 25, wherein producing the 3D computer model of the first room and the 3D computer model of the second room are performed sequentially.

27. The method of claim 25, wherein producing the 3D computer model of the first room and the 3D computer model of the second room are performed simultaneously.

\* \* \* \* \*